(12) United States Patent
Lynch et al.

(10) Patent No.: US 6,823,319 B1
(45) Date of Patent: Nov. 23, 2004

(54) SYSTEM AND METHOD FOR AUTOMATED PROCESS OF DEAL STRUCTURING

(75) Inventors: Joan Lynch, Jenkintown, PA (US); John Howard McNair, Marlton, NJ (US); Stephen John Polito, Sewell, NJ (US); Roberto E. D'Urbano, Mt. Holly, NJ (US); Milton Riseman, Radnor, PA (US); William Kaiser, Maple Glen, PA (US)

(73) Assignee: Home American Credit, Inc., Philadelphia, PA (US)

( * ) Notice: Subject to any disclaimer, the term of this patent is extended or adjusted under 35 U.S.C. 154(b) by 231 days.

(21) Appl. No.: 09/586,462

(22) Filed: Jun. 3, 2000

Related U.S. Application Data

(63) Continuation-in-part of application No. 09/357,066, filed on Jul. 19, 1999.

(51) Int. Cl.[7] .............................................. G06F 17/60
(52) U.S. Cl. .......................................... 705/38; 705/39
(58) Field of Search .............................. 703/35, 38, 39; G06F 17/60

(56) References Cited

U.S. PATENT DOCUMENTS

| | | | |
|---|---|---|---|
| 5,262,941 A | 11/1993 | Saladin et al. | |
| 5,361,201 A | 11/1994 | Jost et al. | |
| 5,481,647 A | 1/1996 | Brody et al. .................. | 706/11 |
| 5,574,828 A | 11/1996 | Hayward et al. | |
| 5,631,828 A | 5/1997 | Hagan | |
| 5,644,727 A | 7/1997 | Atkins .......................... | 705/40 |
| 5,732,397 A | 3/1998 | DeTore et al. ................. | 701/1 |
| 5,774,883 A | 6/1998 | Andersen et al. ............. | 705/38 |
| 5,870,721 A | * 2/1999 | Norris .......................... | 705/38 |
| 6,385,594 B1 | 5/2002 | Lebda et al. .................. | 705/38 |

FOREIGN PATENT DOCUMENTS

| | | | | |
|---|---|---|---|---|
| JP | 09237305 A | 9/1997 | .......... | G96F/17/60 |
| JP | 2001306805 A | 11/2001 | .......... | G06F/17/60 |
| JP | 2002056212 A | 2/2002 | .......... | G06F/17/60 |
| JP | 2002099724 A | 4/2002 | .......... | G06F/17/60 |
| NZ | 508696 A | * 8/2003 | .......... | G06F/15/60 |
| WO | WO 99/59084 | 11/1999 | | |
| WO | WO 109787 A1 | 2/2001 | .......... | G06F/17/60 |
| WO | WO 80123 A1 | 10/2001 | .......... | G06F/17/60 |

OTHER PUBLICATIONS

Lore Croghan, Dime automates consumer lending, Crain's New York Business, May 5, 1997 (From Dialog(R) File 16, acc. No. 05011370).*

Purwandaya, a disertation titled Lender response to credit risk: The case of Bank Perkreditan Rakyat in East Java, Indonesia Univerity of Illinois at Urbana–Champain, 1999 (from Dialog(R) File 35, acc. No. 01711169).*

(List continued on next page.)

*Primary Examiner*—Cuong Nguyen
(74) *Attorney, Agent, or Firm*—Reed Smith LLP

(57) ABSTRACT

An automated deal processing for customers is disclosed, and includes prompting a customer for at least one deal parameter, such as loan amount, prompting the customer for information relating to the customer, such as collateral offered by the customer, accessing in real-time information relating to the credit history of the customer, applying a plurality of origination rules, such as exclusionary rules, pricing rules, risk rules, and edit preference rules, to the at least one deal parameter and the information relating to the customer, applying at least one strategy, such as compensation for risk, repair, or upsell, to the results of the application of the rules, generating at least one deal based on the accessing and applying of the strategy, and presenting the customer with the at least one option. In a preferred embodiment, the automated process of deal structuring is based on the needs and/or the preferences of the customer.

66 Claims, 23 Drawing Sheets

OTHER PUBLICATIONS

Figure 1:
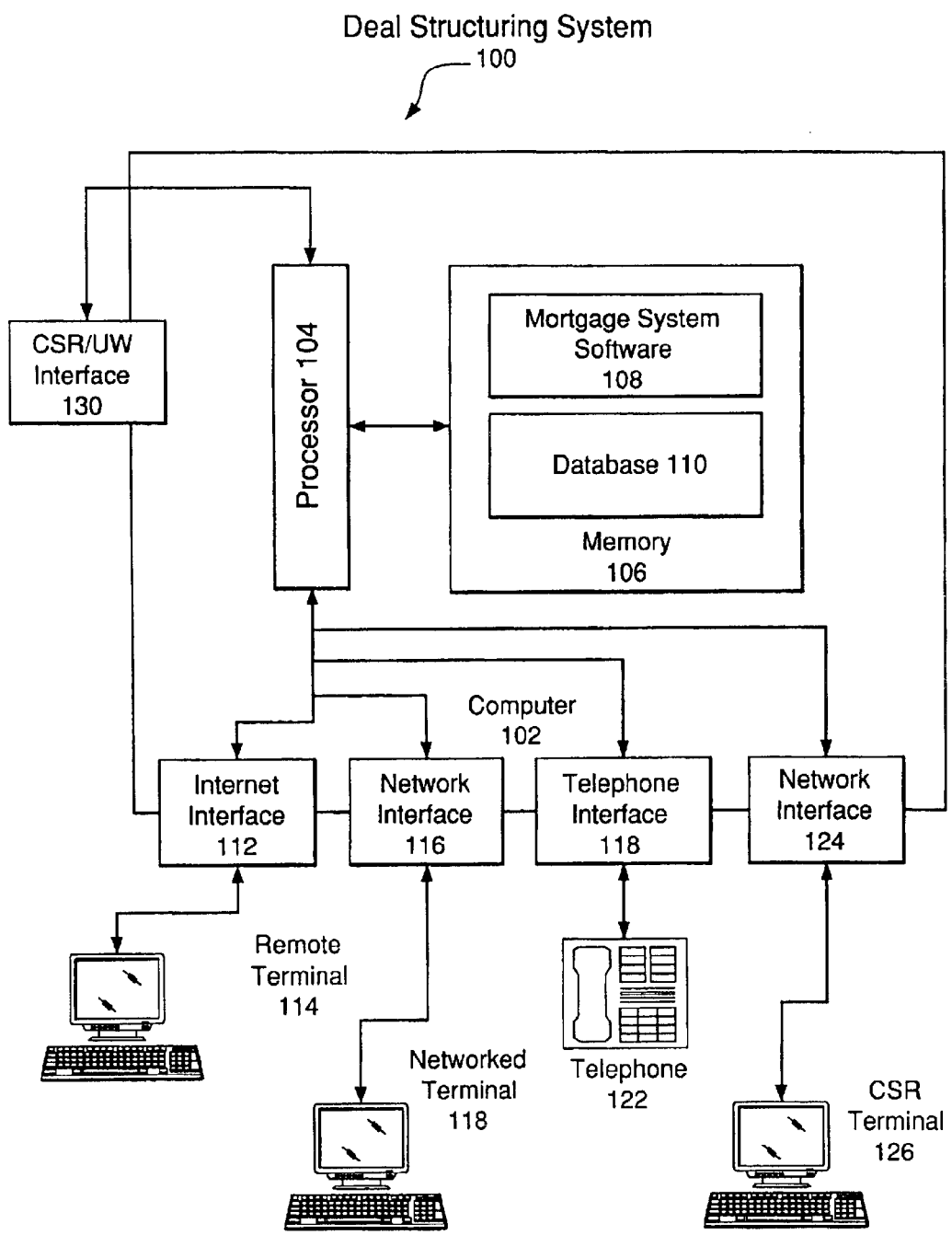

From Dialog(R) File 9, acc. No. 2062086), Affinity picks up some new passengers as is steers a new lending course, Report on Home Banking & Finance Services, v.3 n7, p. 7+, Jan. 16, 1998.*

David Lereah, Decent prospects ahead, Mortgage Banking, v57n4, Jan. 1997 (From Dialog(R) File 15, acc. No. 01363135).*

Phil Britt, Automated loan machines, America's Community Banker, v5n3, Mar. 1996 (from Dialog(R) File 15, acc. No. 01155465).*

Srinivasan, PGPUB–Document–No. 20020116327—Aug. 22, 2002, System and methods for syndication of financial obligations.

Barrett, What bankers want to know before granting a small business loan, Jour. of Accountancy, v169n4 pp. 47–54, Apr. 1990 (Dialog(R) file 15 acc. No. 00494378).

Hopson et al., Expand your practive with loan proposals, WG&L Accounting News v9n3 pp: 1, 26–28, Fall 1988 (from Dialog(R) file acc. No. 00424769).

Graham, Plans hinge on hard–to–get loan, Commercial Appeal, Final Section p. A1, Jan. 17, 1991 (from Dialog(R) file 740 acc. No. 06017177).

From http://www.archive.org/web/ . . . , Internet archive wayback machine for http://www.lendingtree.com wherein it shows lendingtree.com existed since 1999, printed on Jun. 28, 2002.

* cited by examiner

UPLAND MORTGAGE
Real Solutions for Real Life

UPLAND MORTGAGE
LOAN WIZARD

Call 1-877-UPLAND-3 to reach an EasyLoan Wizard customer support assistant

HOME | LOAN TOOLS | PERSONAL SERVICE | ABOUT US | FAQs | CONTACT US

The EasyLoan Wizard was not able to build any loan options for you online at this point.

Upland Mortgage has hundreds of loan options available, however, the EasyLoan Wizard was not able to build an ideal option for you at this point. Please contact one of our loan officers to get more information on loans that may best fit your needs by calling us toll free at 1-877-UPLAND-3. You can also click on the APPLY NOW button and one of our loan professionals will contact you about exciting loan options.

Continue

Sign Out to save your information. You can come back later and sign in to a secure area of our site to complete your EasyLoan Wizard visit.

FIG. 11c

UPLAND MORTGAGE     UPLAND MORTGAGE | Call 1-877-UPLAND-3 to reach an EasyLoan Wizard customer support assistant
Real Solutions for Real Life     LOAN WIZARD

| HOME | LOAN TOOLS | PERSONAL SERVICE | ABOUT US | | FAQs | CONTACT US |
|---|---|---|---|---|---|---|

| | | your pocket | $35.10 | | $45,159.00 | $140,600.00 | $1,537.90 |
|---|---|---|---|---|---|---|---|
| 2.2 | Details | Mortgage and debt consolidation & Cash in your pocket | | | | | |
| 2.3 | Details | Mortgage and debt consolidation & Cash in your pocket | $0.00 | $39,841.17 | $131,448.00 | $177,800.00 | $1,658.39 |
| 2.4 | Details | Mortgage and debt consolidation & Cash in your pocket | $626.57 | $30,341.61 | $105,159.00 | $145,700.00 | $1,666.48 |
| | Option ID | Description | Monthly Savings | Cash Debt | Total Debt Paid | Loan Amount | New Payment |

Click online "Details" xxx APR interest rates

All options include the following benefits
- With a fixed rate mortgage, your payment will not change during the life of the loan.
- We can automatically deduct your payment from your checking account if you choose
- Ability to include your taxes and insurance into your monthly mortgage payment
- No payments for 30 days
- Mortgage interest may be tax deductible, consult your accountant.
- Fast, easy approval and closing
- Fixed rate, no increase in monthly payment.

Sign Out to save your information. You can come back later and sign in to a secure area of our site to complete your EasyLoan Wizard visit.

FIG. 12

UPLAND MORTGAGE
Real Solutions for Real Life

UPLAND MORTGAGE
LOAN WIZARD

Call 1-877-UPLAND-3 to reach an EasyLoan Wizard customer support assistant

| HOME | LOAN TOOLS | PERSONAL SERVICE | ABOUT US | FAQs | CONTACT US |

Details-OptionID2.4

Mortgage and debt consolidation & Cash in your pocket

| UplandID | Lien Position | Loan Amount | Points | Cash Out | Total Debt Paid | Total Fees |
|---|---|---|---|---|---|---|
| 22800001 | 1 | $145,700 | 3.0 | $5,034.61 | $135,159.00 | $919.90 |

| Loan Term | Amortization Term | Current Payment | New Payment | Monthly Savings | Interest Rate | APR |
|---|---|---|---|---|---|---|
| 15 Years | 30 Years | $1,713.00 | $1,386.43 | $326.57 | 10.990 | 11.543 |

Pay-off these existing debts

| Creditor's Name | Balance | Monthly Payment | Is This Mortgage? | Payoff Option | Partial Payoff Amount |
|---|---|---|---|---|---|
| SEARS | $1,734.00 | $42.00 | ☐ | Totally Payoff ▼ | $0.00 |
| WACHOVIA CARDS SVC | $2,700.00 | $66.00 | ☐ | Totally Payoff ▼ | $0.00 |
| FIRST CONSUMERS NATL BK | $72.00 | $15.00 | ☐ | Totally Payoff ▼ | $0.00 |
| FIRST USA BANK | $2,733.00 | $30.00 | ☐ | Totally Payoff ▼ | $0.00 |
| HHLD BANK | $2,059.00 | $54.00 | ☐ | Totally Payoff ▼ | $0.00 |
| BANK OF NEW YORK D | $3,189.00 | $160.00 | ☐ | Totally Payoff ▼ | $0.00 |
| CAPITAL ONE BANK | $450.00 | $13.00 | ☐ | Totally Payoff ▼ | $0.00 |
| BELL ATL C | $260.00 | $0.00 | ☐ | Not My Debt ▼ | $0.00 |

If you would like to contact the national-credit reporting agency regarding any credit information received, please click here.

Sign Out to save your information. You can come back later and sign in to a secure area of our site to complete your EasyLoan Wizard visit.

FIG. 12a

FIG. 12b

UPLAND MORTGAGE
Real Solutions for Real Life

UPLAND MORTGAGE LOAN WIZARD  |  Call 1-877-UPLAND-3 to reach an EasyLoan Wizard customer support assistant HOME | LOAN TOOLS | PERSONAL SERVICE | ABOUT US | FAQs | CONTACT US

THIS IS IMPORTANT...

In order for the EasyLoan Wizard to provide you with the best possible options we will need to know if any of the outstanding item(s) in the list below are associated with the property at:

• 123 ANYSTREET ANYTOWN, PA

Are any of the item(s) listed below associated with this property? [Select ▼]

| Creditor Name | Amount | Discharged? | Balance | | Monthly Payment |
|---|---|---|---|---|---|
| FROST ARNETT COMPANY | 0.00 | [Select ▼] | 925.00 | | 28.00 |

If any of the following bankruptcys have been discharged, please indicate the date of discharge.

| Plaintiff Name | | | Date Discharged | |
|---|---|---|---|---|
| US BKPT CT MS BILOXI | | [Select ▼] | [Select ▼] | |

《Continue》

Sign Out to save your information. You can come back later and sign in to a secure area of our site to complete your EasyLoan Wizard visit.

UPLAND MORTGAGE
Real Solutions for Real Life

UPLAND MORTGAGE
LOAN WIZARD

Call 1-877-UPLAND-3 to reach an EasyLoan Wizard customer support assistant

HOME | LOAN TOOLS | PERSONAL SERVICE | ABOUT US | FAQs | CONTACT US

We have successfully retrieved your information from the credit bureau.

In our experience, nearly everyone has a mistake or two on their credit report. Mistakes can cost you money and buying power. That's why it pays to take the time to review your credit information carefully. If you would like to review the credit information we received from the credit bureau simply click on the "Review Credit" button below.

If you find a mistake, you'll need to contact the appropriate credit reporting bureau to dispute the reported debt. In the meantime, if you feel an item is incorrect, simply select the appropriate reason in the drop down menu next to that debt and the EasyLoan Wizard will use that information to build your personal loan options.

As soon as the EasyLoan Wizard returns the recommended loan options, you can make changes to your preferences to learn if there are other loan options that would make more sense for you.

[Review Credit]  [Continue]

Sign Out to save your information. You can come back later and sign in to a secure area of our site to complete your EasyLoan Wizard visit.

FIG. 13

FIG. 14

UPLAND MORTGAGE
Real Solutions for Real Life

UPLAND MORTGAGE LOAN WIZARD

Call 1-877-UPLAND-3 to reach an EasyLoan Wizard customer support assistant

HOME | LOAN TOOLS | PERSONAL SERVICE | ABOUT US | FAQs | CONTACT US

Benefits

- One payment monthly versus 8
- You have enough equity in your home to refinance and get an extra $ 5906.87 to use any way you wish
- With a fixed rate mortgage, your payment will not change during the life of the loan.
- We can automatically deduct your payment from your checking account if you choose
- With a new mortgage from us your first payment is not due for one month from closing. It's like getting an extra $ 2776.96 in cash savings in your pocket.
- Ability to include your taxes and insurance into your monthly mortgage payment
- Ability to include your taxes and insurance into your monthly mortgage payment
- Fixed rate - no increase in monthly payment
- Fast, easy approval and closing
- No payments for 30 days
- Mortgage interest may be tax deductible, consult your accountant

Explanations

- Restructured by paying off more debts
- The Chase Account FIRST CONSUMERS NAT'L BK account of $ 70.00 has been paid in order to maximize debt consolidation
- Restructured into one balloon
- Restructured by adding additional cash
- The Credit Card: BANK OF NEW YORK D account of $ 3189.00 has been paid in order to maximize debt consolidation.

Non-Mortgage Payoff-Detail

| Name of Creditor | Monthly Payment | Amount Paid |
|---|---|---|
| WACHOVIA BANK CARD SVC | 66.00 | 2,700.00 |
| HHLD BANK | 54.00 | 2,059.00 |
| SEARS | 42.00 | 1,734.00 |
| BANK OF NEW YORK D | 160.00 | 3,189.00 |
| CAPITAL ONE BANK | 13.00 | 450.00 |
| FIRST CONSUMERS NAT'L BK | 15.00 | 72.00 |
| FIRST USA BANK | 30.00 | 2,733.00 |

Sign Out to save your information. You can come back later and sign in to a secure area of our site to complete your EasyLoan Wizard visit.

SYSTEM AND METHOD FOR AUTOMATED PROCESS OF DEAL STRUCTURING

CROSS REFERENCE TO RELATED APPLICATIONS

This application is a continuation in part of U.S. patent application Ser. No. 09/357,066, filed Jul. 19, 1999.

BACKGROUND OF THE INVENTION

1. Field of the Invention

The present invention relates generally to transactions, and more particularly to a method and system for deal structuring.

2. Description of the Background

The structuring of deals for customers has traditionally been a protracted and inefficient process. The customer might provide copious amounts of financial and potential collateral information to a salesperson, who would attempt to structure a deal from a commercial lender to the customer. This process would require the expenditure of large amounts of time on the part of both the customer and the sales person.

The typical loan originating process, for example commences when a potential borrower, i.e. a customer, first contacts a loan salesperson by telephone. The salesperson extracts the information required from the potential borrower to generate a provisional loan, without knowing whether the mortgage loan will meet a lender's underwriting policies. The salesperson may then request that confirmation information, such as income documentation, be presented.

The information, and all of the paperwork, is then routed to the lender's processing department, where additional documents, such as credit reports, might be requested and retrieved, either manually or automatically. Eventually, the documents are forwarded to an underwriter, who then determines whether the requested loan meets the lender's underwriting policies, and whether any further documentation is necessary, and may approve the loan.

If the loan does not meet the lender's underwriting policies, the underwriter and the salesperson may then negotiate changes to the terms of the loan necessary to meet these policies. After the underwriter and the salesperson agree on the changed terns, the salesperson and the potential borrower must negotiate with respect to the terms agreed on by the underwriter and the salesperson.

Any further amendments agreed to by the potential borrower and the salesperson might require further negotiations between the salesperson and the underwriter, and the loan origination process thus continues iteratively until all parties come to an agreement, all possible loan permutations are rejected, or the potential borrower abandons the process in frustration. If the parties reach an agreement, the process continues through the approval, closing, and servicing stages.

SUMMARY OF THE INVENTION

Automated deal processing for customers includes prompting a customer for at least one deal parameter, such as loan amount, prompting the customer for information relating to the customer, such as collateral offered by the customer, accessing in real-time information relating to the credit history of the customer, applying a plurality of origination rules, such as exclusionary rules, pricing rules, risk rules, and edit preference rules, to the at least one deal parameter and the information relating to the customer, applying at least one strategy, such as compensation for risk, repair, or upsell, to the results of the application of the rules, generating at least one deal based on the accessing and applying of the strategy, and presenting the customer with the at least one option. In a preferred embodiment, the automated process of deal structuring is based on the needs and/or the preferences of the customer.

The automated process of deal structuring offers many benefits to both a deal offeror, such as a lender, for example, and a customer, such as a potential borrower. For the offeror, i.e. the lender, the benefits include leveraging the skills of the lender's experienced loan officers by utilizing computers to handle data entry chores, to apply underwriting rules, to perform repetitive calculations, and to store all data relating to a potential borrower for later use, thereby freeing the loan officers to time additional or other matters. Additionally, an automated process ensures consistent application of rules to each deal attempted under the automated system, and allows for consistent explanations of the benefits of deals structured. Moreover, the automated process provides guidance to less experienced loan officers who might otherwise initially suggest terms unacceptable to the lender's underwriters, wasting the time of the loan officers, the underwriters, and the potential borrowers.

The automated process of deal structuring benefits the potential borrower by providing the ability to easily explore different deal scenarios, as well as greatly reducing the amount of time required to obtain approval of a mortgage loan. Additionally, the customer may be offered options which a loan officer might not have developed manually, and may benefit from a greater number of offerors, such as lenders, to which the automated process has access, but a loan officer would not.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a deal structuring system and method. Those of ordinary skill in the art will recognize that other elements are desirable and/or required in order to implement the present invention. However, because such elements are well known in the art, and because they do not facilitate a better understanding of the present invention, a discussion of such elements is not provided herein. Additionally, it should be noted that, although the invention disclosed herein may make reference to specific deal structures, such as sub-prime products, the invention may be applied in substantially the same manner as disclosed herein to numerous deal structures, such as, but not limited to, conforming, non-conforming, prime, sub-prime, fixed, jumbo, balloon, etc. Further, although certain examples of the present invention are discussed with specific reference to loans, it will be apparent to those skilled in the art that the present invention can be used for all deal types, including, but not limited to, insurance, for example. The disclosure hereinbelow is directed to all such variations and modifications to deal structure known to those skilled in the art.

This application is a continuation in part of application Ser. No. 09/357,066, filed Jul. 19, 1999, incorporated herein by reference.

The following definitions are provided to aid in construing the specification and claims of the present application:

Expert System: Expert systems enable computers to make decisions for solving complex nonnumeric problems.

Whereas conventional computer programs principally perform functions such as data manipulation, calculations, and data storage and retrieval, expert systems use a knowledge base and an inference engine to make decisions. The expert system of the present invention can be implemented with a commercially available rule-based expert system, such as ART-IM (provided by Inference Corporation), ART* Enterprise (provided by Brightware, Inc.), or Arity/Prolog (provided by Arity Corp.).

Knowledge Base: a knowledge base is a collection of rules that represent the human expertise of a particular knowledge domain. Rules are typically constructed in an IF-THEN-ELSE format, e.g., IF Property Type=High Rise AND State=NY THEN Proceed ELSE Flag For Review. The knowledge base is typically stored in a storage medium of a computer.

Inference Engine: an inference engine is a software deal structuring that runs on a computer. An expert system operates by running a knowledge base through an inference engine and applying all of the rules to the input data for a given problem.

Customer: A customer is a consumer, business, or other entity that deals directly with the automated process of deal structuring, or with a customer service representative accessing the automated process of deal structuring. Although in certain preferred embodiments of the present invention a customer must be a natural person, in other embodiments of the present invention a customer may be a corporation, partnership, or other entity. A customer is, for example, a consumer desiring a deal, such as a loan, a business seeking deal information, a third party broker, or a partner (such as a mortgage broker) seeking deal related information or services, such as real-time pricing terms.

Customer Service Representative ("CSR"): An employee, an affiliate, or a partner of the offeror, such as a lender, whose responsibilities may include assisting a customer to apply for or consummate a loan, or whose responsibilities include interacting with the customer in connection with the development or consummation of a deal consummated loan. CSR's include, but are not limited to, business representatives, loan officers, loan processors, risk reviewers, auditors, and the like.

Underwriter ("UW"): An underwriter is responsible for verifying that a proposed deal, such as a proposed loan, complies with an offeror's, i.e. a lender's, underwriting standards, and approves or disapproves the deal.

Credit Reporting Agency ("CRA"): A third party entity that monitors the credit history of a natural person, corporation, partnership, or other entity, including the entity's loan repayment history, bankruptcy history, public record history, credit history inquiries, and the like.

Credit Grading: The conversion of information contained in a customer's credit history into a qualitative factor that is suitable for evaluation within the deal structuring process. The credit grade is transformable, using a set of credit transformation rules, to a format compatible with the credit grade scale of the lender or of a third party lender.

Product/Deal: A product or deal is offered by an offeror, such as a lender, and may include, for example, a fixed rate loan, an adjustable rate loan, a balloon loan, a hybrid, or other loan. A product or deal may also be differentiated by term, lien position, origination rules or fees, origination points, or other characteristics.

Exclusionary Rules. Exclusionary Rules are a sub-set of origination rules. Exclusionary rules result in a customer being excluded from a deal offer.

Loan-to-Value ("LTV") Ratio. The ratio of the gross amount of a loan to the value of the property securing the loan. LTV is commonly expressed as a percentage calculated by dividing the gross loan amount by the collateral value.

Combined Loan to Value ("CLTV") Ratio. The ratio of the sum of the gross amount of a loan and the gross amounts of all other senior loans secured by the same collateral to the value of the collateral securing the loan. CLTV is commonly expressed as a percentage calculated by dividing the sum of the gross loan amount and the gross amounts of all other senior loans and/or liens secured by the same collateral.

Debt-to-Income ("DTI") Ratio. The ratio of monthly debt service to the amount of monthly income. The monthly debt service is the sum of the debt service on all of a customer's debts. When DTI ratios are evaluated pursuant to a determination of whether a loan should be offered to a customer, the DTI ratio is calculated including the payments required to service the loan being requested and excluding any debt that would be paid off or discharged if the loan were approved and consummated.

Referring now to FIG. 1, a preferred embodiment of the present invention directed to automated process for deal structuring is illustrated. As shown in FIG. 1, the deal structure system (DSS) 100 includes a computer 102, which may be a mainframe computer, a minicomputer, a microcomputer, or other general purpose computing machine. The computer comprises at least one processor 104 and a memory 106, which may be temporary memory, such as random access memory, permanent storage, such as a hard drive, or a combination of temporary memory and permanent storage. Mortgage System Software 108 [hereinafter "MSS"] is stored in memory. Alternatively, MSS 108 may be stored on a removable computer readable medium, such as a CD-ROM (not shown).

The memory is also used to store data regarding each deal structuring. This information can be stored in a database 110 within the memory 106. The database 110 is preferably a database managed by a database management system, such as Informix, Oracle, or Sybase.

The computer 102 also has several interchanges, such as interfaces, for communicating with other entities. These interfaces include an internet interface 112 for communicating with customers 114 accessing the DSS 100. Also included is a network interface 116 allowing networked computers to access the DSS 100. The network computers 118 can be located in a facility operated in conjunction with DSS 100, such that loan customers can access the system without having Internet access. The system also has a telephone interface 120, such that customers can dial into the system to access DSS 100. The system also has a customer service representative (CSR) interface 122 so that salespeople 124 can access the system and utilize the automated processing of the DSS system 100. Further, the system includes a remote interface, which allows a CSR at a remote location to access the DSS. The system further includes a non-interface, which allows a CSR to operate the DSS in stand-alone mode. In addition, the illustrated DSS system 100 may include at least one third party interface, for third parties such as credit bureaus and third party loan offerors. The DSS 100 also includes an interface that invokes a CSR or underwriter interface 130 (hereinbelow called the CSR/UW interface) to become involved in a deal structuring when invoked by a customer. There may or may not be limitations placed on the invocation of the CSR/UW interface, such as time limitations or multiplicity limitations, and the placement of such limitations on invocation will be understood to those skilled in the art.

Figure 2:
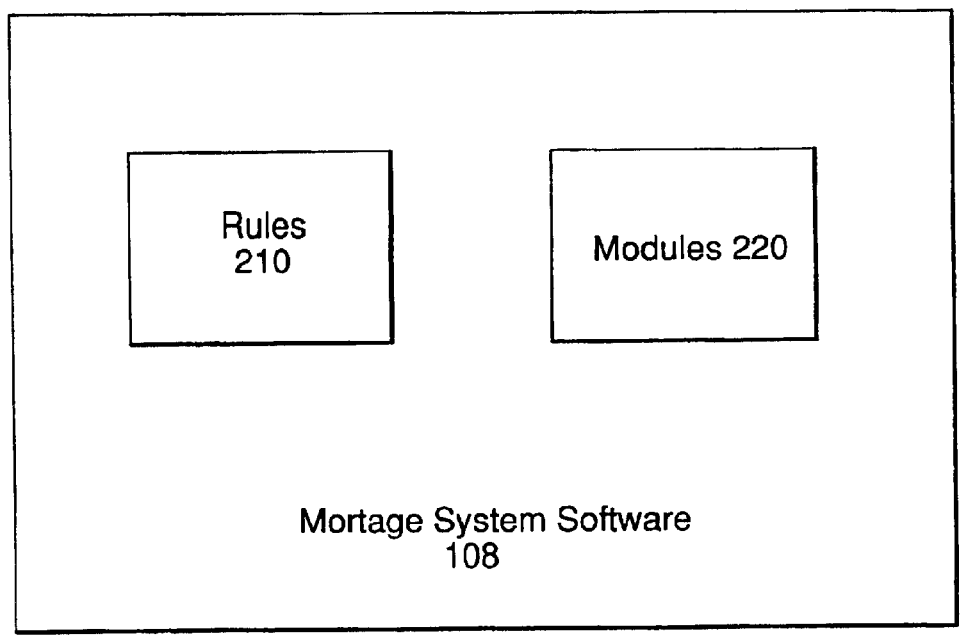

FIG. 2 illustrates one embodiment of the MSS 108 of the present invention. The MSS 108, resident on the DSS 100, preferably includes rules 210, and modules 220. One example of MSS rules 210 is own products exclusionary rules and third party, such as independent investors, exclusionary rules, for application to the information entered by a customer in a deal structuring. A second example of MSS rules 210 is pricing and risk rules, such as compensating factors rules, which provide rules for adjusting the eligibility of a customer based on ancillary factors such as time on a job, or disposable income, and such as repair rules regarding repairing LTV and DTI by changing customer preferences and recalculating the deal, and such as up-sell rules regarding the availability of greater loan amounts than requested by the customer, and the applicability of offering such greater amounts to the customer. A third example of MSS rules 210 is edit preference rules that include interactions for proposals and counter-proposals of varied customer deal preferences between the customer and the DSS system 100 (for example, a customer can express a desire for a lower interest rate, which is countered by the DSS 100 by requiring additional points at mortgage inception). The MSS preferably also includes credit grading and credit transformation rules. Additionally, MSS 108 may include benefits rules, which identify the benefits of a specific product for a customer.

The MSS further preferably includes explanation rules. Explanation rules are provided to bridge the gap between the deal, such as a loan, offered, and the deal the customer requested and/or expected. Explanation rules determine what explanation should be provided to a customer regarding an acceptance or refusal of, for example, the lender, to offer a product. The explanations provided are audience specific. For example, the explanations given directly, via a computer screen, to a customer in an internet based deal structuring, will be directed to a more inexperienced deal structuring audience, while the explanation provided to a CSR to, in turn, be given to a customer, would be directed to a more experienced deal-structuring audience. Further, different explanations directed only to CSRs allow an offeror to prevent disclosure to the public, and, specifically, to competitor offerors, of, for example, underwriting and offering rules. Generation and storage of a explanations can provide an offeror with a record of reasons for deal refusal, should a customer later argue that refusal was improper, and can provide an offeror with a record of reasons for deal acceptances, thus helping to provide an empirical database of common reasons for acceptance and refusal.

The MSS may additionally include cross-selling rules. Cross-sold products may or may not relate to the deal requested by the customer. Cross-sold products may include, for example, property and personal insurance, escrowing and loan payment direct deposit services, and services related to the acquisition of the new property, such as title abstracting and home inspection services. Whether or not to offer cross-sold products may be dependent on specific characteristics associated with each customer, or may be dependent on specific needs of each customer, which needs may be assessed through the preferences and choices entered by the customer to the MSS.

The MSS may additionally include stipulation rules. Stipulations may include requirements that must be met by the customer before the consummation of the deal, such as to consummate the loan. Stipulations may include, for example, that additional documentation be provided before a loan can be consummated, such as documentation of paychecks or bank accounts. The stipulation rules may include UW knowledge to recognize deficiencies in a deal, as well as general stipulations, and may be generated empirically by the MSS as the MSS develops a knowledge of stipulations generally necessary from every customer, or may be developed as an accumulation of outside materials, such as UW suggestions.

The MSS 108 also preferably includes instruction modules 220 to allow for the saving of a deal structuring record before the entirety of necessary information, such as customer information, has been obtained. Thereby, a deal structuring can be saved, and returned to and accessed by the same customer, or a CSR, for completion at a later point. The generation of security measures for preventing unauthorized access, by anyone other than the same customer, or by a CSR, to the stored deal structuring, and retrieval of the stored deal structuring, are also preferably included in the "stop and save" instructions of the MSS.

The MSS 108 may also include a "status check" module 220. Such a module allows for the checking of status on certain elements of a deal, such as the status of certain stipulations required in a deal.

The description hereinabove is directed toward interaction between customers and the DSS 100, and CSRs serving as intermediaries between the customer and the DSS 100. A CSR/UW module 220 of the MSS may allow the CSR to generate a loan deal structuring record for a customer, and access and edit the record, and may provide tools for assisting a customer in understanding the determinations generated by the DSS system 100. Thus, although the same DSS 100 is accessed, the interface of the customer, i.e. a deal structuring novice, or a competitor, or a partner, may be designed differently than the interface of the CSR or UW with the DSS 100, who possess greater expertise in deal structuring, and who are authorized to access all or most information in the possession of the offeror with whom the customer is automatically processing the deal structuring, as discussed hereinabove.

Figure 3:
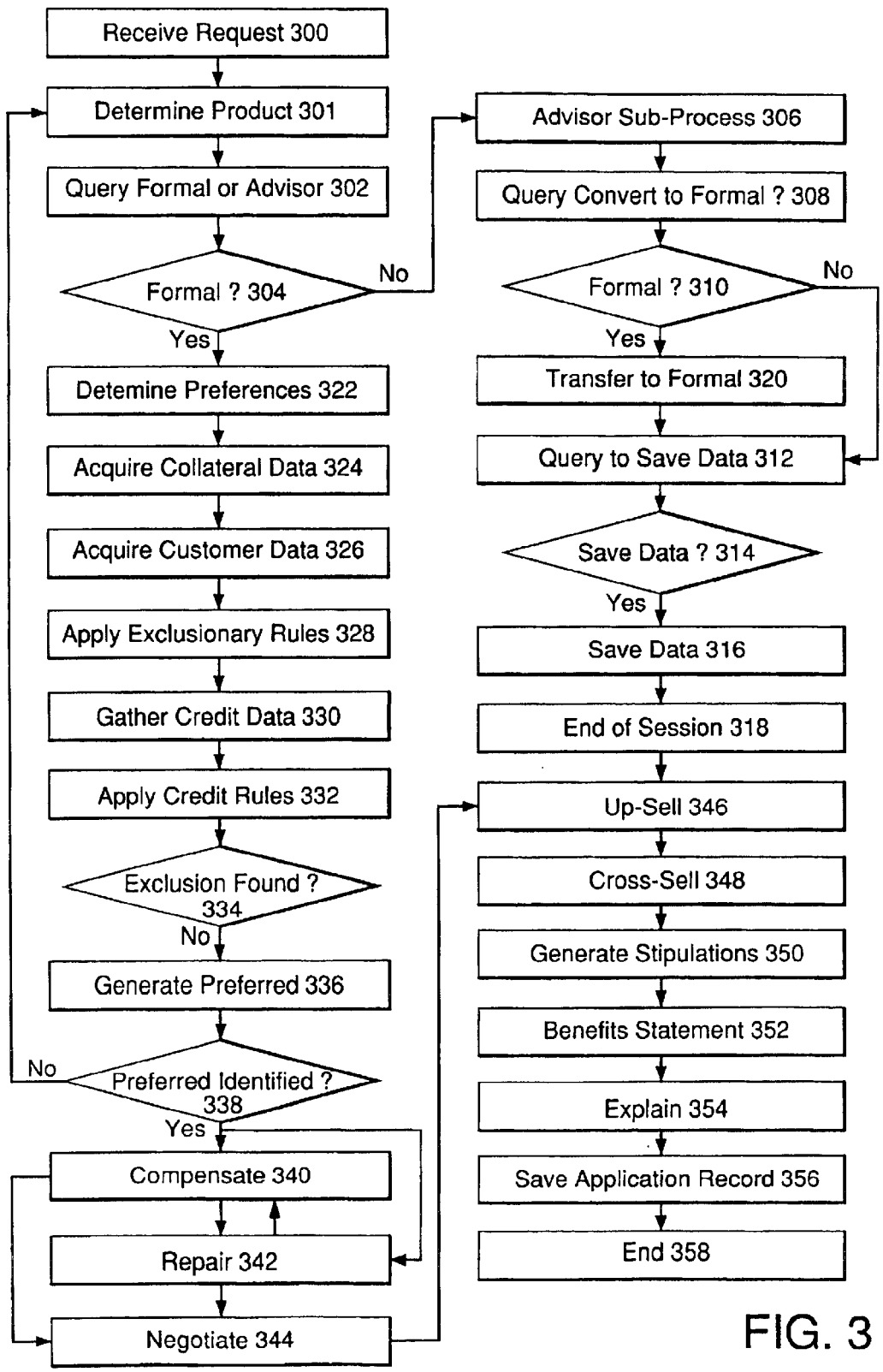

Referring now to FIG. 3, a method in accordance with a preferred embodiment of the present invention is illustrated. The method first receives 300 a request from a customer for information regarding the offeror's products. The customer is then queried 302 as to whether the customer would like to enter a formal deal structuring, or utilize a deal-structuring adviser, as discussed hereinbelow. If it is determined 304 that the customer would like to use the adviser, the customer is transferred to the adviser 306.

The advisor ("ELA") allows a customer to gain a better understanding of their financial needs, without incurring the requirements associated with formal deal structuring. The advisor may be an MSS module 220, or may be a stand alone program. The advisor allows the entry of anonymous information, thus allowing customers to evaluate options, and perhaps test eligibility, without having to disclose identity and large amounts of information. Finally, the information obtained during an advisor session can be transferred to the formal deal structuring process, with the DSS system 100 querying for additional information in the formal process not gained in the advisor process.

Thus, the ELA may advise a customer, based on limited information requested and received from the customer, of the types and amounts of products which would likely be available to the customer if the customer chose to pursue a formal deal structuring. For example, the ELA may or may not request access to the user's credit history. The ELA provides carry over, upon election of the customer, to the formal process.

ELA is preferably a web-based deal structuring implemented using Java technology, although other technologies may be used. It is preferable that the technology used allow the developer to mix HTML (static content) with Java code to produce dynamic content (HTML output). The ELA may use, for example, an Oracle database to store data entered by the user, to read in static data used to determine the advice text, and to populate dropdown list boxes. Thereby, data entered by the customer is stored after each screen by calling an Oracle package, for example. Whenever possible, the data requested from and given to the customer is stored in an existing loan origination database table within the MSS 108. Data that has no corresponding storage location in the loan origination database is written to an ELA software table.

In an exemplary embodiment, the first page of ELA might invite a user to enter a limited plurality of information, such as first name, and asks that the user choose one of at least four possible paths for the deal (refinance, debt consolidation, cash out and new home purchase, for example).

The first option second page is called, for example, when the user selects refinance as the loan purpose. The first option second page reads all its deal structuring level data from the loan origination database the first time it is called. Upon this selection, the ELA may populate a series of drop down boxes, may store user data in the database, and may support logic, for example. The logic may include, for example, the calculation of an LTV, an DTI, and dynamic generation of advice messages (ELA recommendations). The second option second page is called, for example, when the user selects debt consolidation as the loan purpose. The second option second page is implemented similarly to the first option second page, discussed hereinabove. The third option second page is called, for example, when the user selects cash out as the loan purpose. The third option second page is implemented similarly to the first option second page, discussed hereinabove. The fourth option second page is called, for example, when the user selects New Home Purchase as the loan purpose. If the user selects this option, the ELA may collect different information from the user than that collected in the first, second, or third option second pages. Upon this selection, the ELA may also populate a series of drop down boxes, may store user data in the database, and may support logic, for example. Further, the ELA reads all its deal structuring level data from the loan origination database the first time it is called. The logic includes, for example, the calculation of the LTV, the DTI, and dynamic generation of advice messages (ELA recommendations).

Additional information is preferably entered by the advisor user at the second, or a subsequent, page of the ELA, although this additional information must be entered before preparation of the final advice page. Such additional information would preferably include, for example, number of Liens, Payoff existing on collateral, what to Spend Cash out On, Years present Home Owned, Fair Market Value of present home, current mortgage balance, purchase price, monthly income, and monthly debt.

The final page of the exemplary ELA would be the last step in an e-user interaction. This page dynamically generates a recommendation given the information provided during the session. From this page, a user can enter a formal deal structuring via a hyperlink, for example. User data such as first name and generated data such loan id, address id and entity id are passed to the formal deal structuring, at MSS 108. The ELA may additionally include, for example, a calculator implemented as a standalone page that can be requested by the user to aid in calculations associated with the ELA process.

Upon completion of the advisor, or, in the embodiment wherein a customer does not choose the advisor, the system queries, at step 308, the customer as to whether he would like to enter a formal deal structuring. Step 310 determines that the customer would not like to enter a formal deal structuring, and thus step 312 presents the customer with the ability to save any entered data for later sessions. If it is determined at step 314 that the customer desires to save any entered information for later sessions, the information is saved 316 with security provisions and the session is ended 318. If it is determined 314 that the customer does not desire to have any information entered, the session is ended 318. If it is determined 310 that the customer desires to switch to a formal deal structuring after the adviser session, the information is transferred 320 to the formal deal structuring process.

If it is determined 304 that the customer desires to enter a formal deal structuring, after, or without choosing, the advisor, the system queries the customer to acquire 322 the customer's preferences. Table 1 provides a list of common elements related to a customer's desired preferences. The customer is then queried to acquire 324 information regarding collateral with which the customer can secure the requested loan, and queried to acquire 326 information regarding the financial condition of the customer. Table 2 shows a list of common elements related to the evaluation of potential collateral for securing an offered loan. The appraisal information for the proposed collateral can include estimates of appraised value of the collateral based on valuations for taxes, or recent transfers of similar properties, for example.

In addition to name and address information, the interface can prompt the customer to provide a taxpayer I.D. number, which for private citizens is generally a Social Security number. Table 3 lists a set of common elements related to the financial suitability of a customer for being offered a product. Once the requisite characteristics have been received from the customer, the system can gather 328, with customer permission, credit history from a CRA, as well as collateral value information regarding the proposed collateral from a fourth source. A customer may grant permission to access the CRA by clicking an "Accept" button, or by assenting to a question from a CSR, for example. Further, the standardizing of the credit data may include credit grading and transforming.

This information is then processed by the DSS 100 to form 330 a deal structuring record for the deal structuring process. The deal structuring record is contained in a database 106 to allow access to the data by the DSS system 100, including access for CSRs or UWs who require access to the data to evaluate product offerings. Forming the record also generates standardized parameters for the deal structuring, such as maximum allowable loan-to-value (LTV) and debt-to-income (DTI) ratios. The combined preferred parameters, potential collateral data, customer suitability information, credit history, and collateral appraisal information can then be joined to form an deal structuring record.

Once the deal structuring record has been completed, exclusionary rules can be iteratively applied 332 to the deal structuring record to determine whether the offering of a product to the customer should be excluded based on the contents of the record. The exclusionary rules are discussed hereinabove, and can include exclusions based on the location of the potential collateral, or the credit history of the borrower, for example. Table 4 lists several collateral and credit history exclusionary rules for illustrative purposes. The exclusionary rules are iteratively applied, with the offeror's exclusionary rules being applied first, then the MSS looping through a processing of all rules with respect to the offeror, and then a second iteration with respect to a first third party offeror, and then rules with respect to that first third party offeror, and then a third iteration using a second third party offeror, and so on. In a second preferred embodiment, the iterative loop is performed only with respect to the exclusionary rules, and then the iterative loop is repeated using the rules of all parties not excluded by the exclusionary rules. Thus, the present invention offers application of unique rules for each of numerous lenders in an iterative rule application.

In one embodiment of the present invention, the application of the exclusionary rules to the deal structuring record is accomplished by MSS 108 using an inference engine 206. The application of the exclusionary rules may be accomplished by numerous other methods, which methods will be apparent to those skilled in the art. Based on the information in the deal structuring record, the inference engine 206 applies rules based on the likelihood of applicability. For example, if the property type of the potential collateral is "single family detached residence", the inference engine may apply rules based on residential properties before applying rules based on commercial use concerns.

Once it has been determined 334 that no exclusionary rules bar the offer of a product to the customer, with respect to at least one possible offeror, UW rules can be applied to the deal structuring record to determine whether a deal characterized by the customer's requested parameters can be offered to the customer. It will be apparent to those skilled in the art that a credit grading and transformation, such as downgrading the credit grade based on bankruptcy, foreclosure, or public records, may be necessary to allow the application of certain of either the exclusionary rules of the offeror or third party offerors, or of the UW rules of the offeror or a third party offeror. The UW rule process is preferably iteratively applied. The UW rules may be applied in turn for each possible offeror following the exclusionary rules of that offeror, or may be applied only after global application of all exclusionary rules. The UW rule process involves the identification 336 of one or more preferred products which may be suitable for the customer. Different product types are preferably characterized by different product characteristics, such as shorter duration deals having lower interest rates, and longer duration deals having higher interest rates, for example. Further, interest rates also tend to vary from property type to property type, and according to credit rating, and as a function of the LTV ratio, for example.

A preferred option may be generated at step 336, through the UW rules process. As used herein, "preferred option" includes the options that meet the preferences of the customer or the user. A preferred loan option is generated 336 by selecting from the offeror's available product types those products whose rules are satisfied by the elements stored in the deal structuring record. Each product type, of the offeror and third party offeror or offerors, may be considered an option for meeting the customer's preferences request. Each product type option is examined to determine if the elements in the deal structuring record meet the specific requirements of the product type. For example, if a customer's preferred request is for an amount more than an option's maximum product amount or less than an option's minimum product amount, that option may be disqualified, compensated, or repaired, as discussed hereinbelow. As another example, if the preferred request is characterized by a loan to value (LTV) ratio greater than an option's maximum allowable LTV ratio, the option may be disqualified, compensated, or repaired. Options may also be disqualified if the property type for which the deal is requested differs from the property types for which the option is available, or if the occupancy range of a preferred request differs from the allowable occupancy range of that option. Other factors which might disqualify options might include credit grades differing from the allowable range for the option, differing input documentation level from that allowable for the option, and/or differing lien positions from those allowable for the option, for example. If more than one option is applicable for meeting the customer's preferred request, the remaining options may be prioritized. This prioritization can be selected by the offeror or offerors, or by the customer by clicking a "Sort by" tab or icon, for example, and may be done by many priorities that will be apparent to those skilled in the art, such as, but not limited to, monthly savings, lowest lien position, etc. If only one option remained applicable after each factor has considered, then that option is the preferred option. Once the preferred option, or hierarchy of options, have been identified, the terms of the option or options are recorded for association with the deal structuring record, and the preferred request is completed.

If no preferred options are identified following this procedure, pricing and/or risk rules, such as compensating rules 330 and/or repair rules 332, can be applied to attempt to gain an option that is acceptable to the offeror or offerors.

Figure 4:
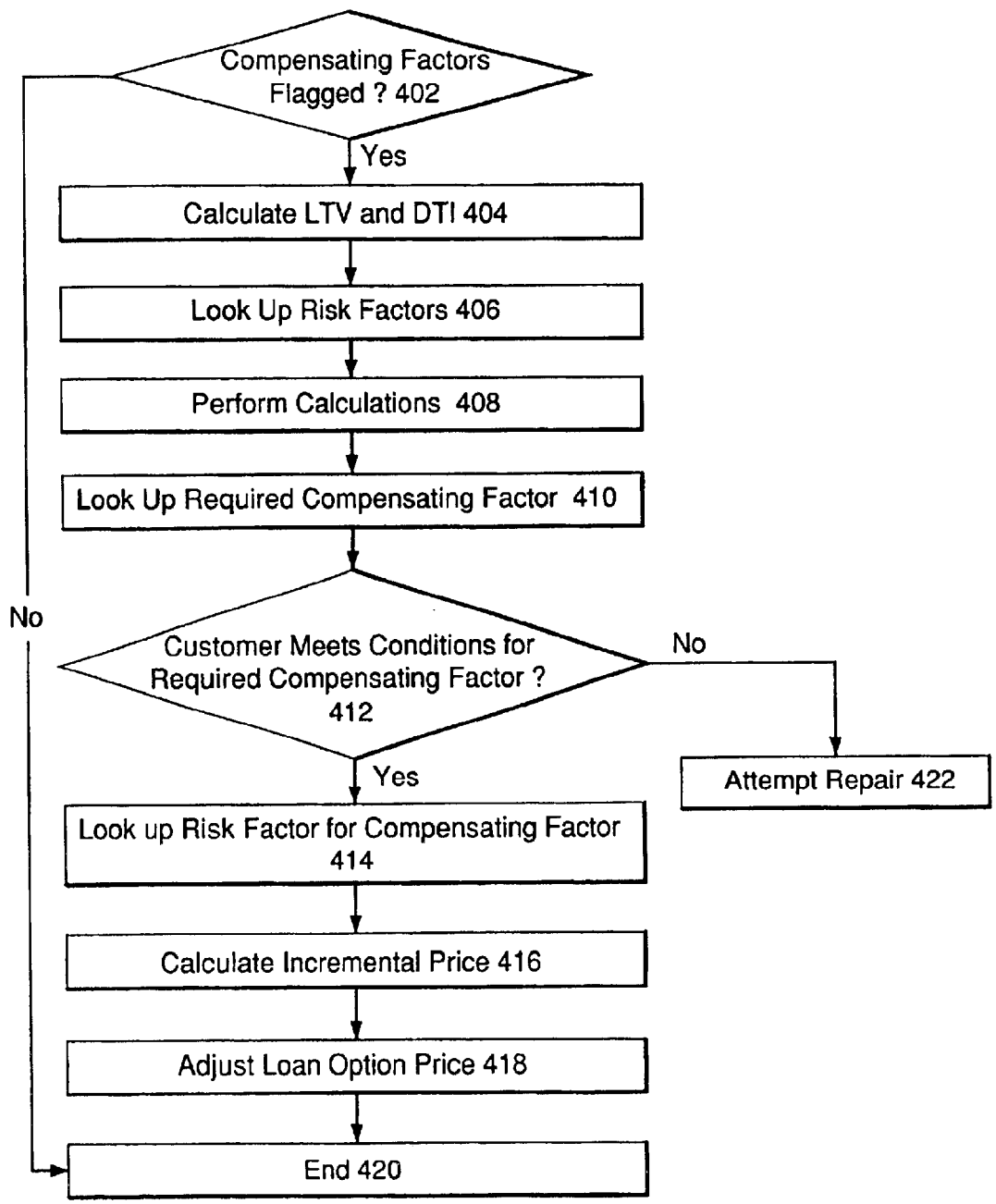

Compensating rules are provided in the MSS to offset conditions that fall outside of the offeror's, or offerors', guidelines. An overview of the compensation process can be seen in FIG. 4. The application of compensating factors may enable the customer to qualify for a product although, for example, the customer's DTI is excessively high. A compensating factor is essentially a tradeoff to compensate the offeror for the increased risk, thus providing flexibility for the offeror when the qualifications of a customer do not meet the requirements of a offeror's, or the offerors', products. The use of compensating factors enables the offeror to override the requirements of a product in an attempt to offer a modified option, rather than a preferred option, to the customer, rather than not offering any option. In some cases, the application of compensating factors may result in additional risk to the offeror that can be offset by increasing the price, such as an increase in the interest rate.

Compensating factors may be applied under three conditions: the product amount is greater than the maximum allowable product amount and less than or equal to the marginal amounts over the standard maximum; the LTV is greater than the maximum LTV and less than or equal to the marginal amounts over the standard maximum LTV; and/or the DTI is greater than the maximum DTI and less than or equal to the marginal amounts over the standard maximum DTI. For example, the standard maximum DTI might be 50%, but the marginal amounts over the standard maximum DTI might be 55% for a particular product. If a generated option is one wherein one or more of the product amount, LTV and DTI exceed the respective standard maximums, but are less than the marginal amounts over the standard maximums, the generated option is flagged for the application of compensating factors. In such an instance, the compensating factors are applied to re-price the generated option in order to compensate for the increased risk.

The incremental price, expressed in basis points added to the interest rate of the preferred mortgage loan option, is calculated based, in part, on the risk factors for the documentation type, the property type, the mortgage loan amount, the lien factors, the occupancy type, the credit grade, and the compensating factors, for example. The risk factors are then generated from an MSS look-up table that associates a risk with each documentation type, property type, mortgage loan amount, lien factor, occupancy type, credit grade, and compensating factor, for example.

A customer must then fall within a predetermined total maximum risk in order to receive a compensated product option. Following a calculation of the customer's predicted post-deal disposable income and savings, using formulas known in the art, the MSS looks up the required compensating factor. The compensating factors may be defined, for example, for a specific combination of Credit Grade, Documentation Type and Property Type, or for a specific total risk value.

The customer is then tested to assess whether the customer meets the conditions to have the required compensating factor applied to the deal. The manner of formulating these types of tests used will be apparent to those skilled in the art. If the customer fails the corresponding test, it indicates that the customer does not qualify to have the required compensating factors applied to the deal, and that the price of that option cannot be compensated to account for the increased risk with respect to that customer.

If the customer passes the above-referenced test or tests, an incremental price may then be calculated by weighting each of the four mortgage loan attributes mentioned above, and then applying a formula multiplying the risk factor by the weight of each factor including a risk, and multiplying that total by a pricing factor. The option is then adjusted for price by the amount of the incremental price.

It will be apparent to those skilled in the art that other loan attributes could be compensated for increased risk, such as length of time in a residence, or the length of time in a current job, for example. Those loan attributes would be compensated in substantially the same manner as the attributes discussed above.

Additionally, the repair and compensation steps of the present invention may be performed alone, or in conjunction. For example, a customer may receive one or more options based on repair, and one or more loan options based on compensation. Further, a customer may receive one or more options that are both repaired and compensated. The factors used in both the repair and/or the compensation rules may be the same or similar factors, and the rating of risk process may be the same or similar in both the repair and compensation modes, either alone or in combination.

Figure 5:
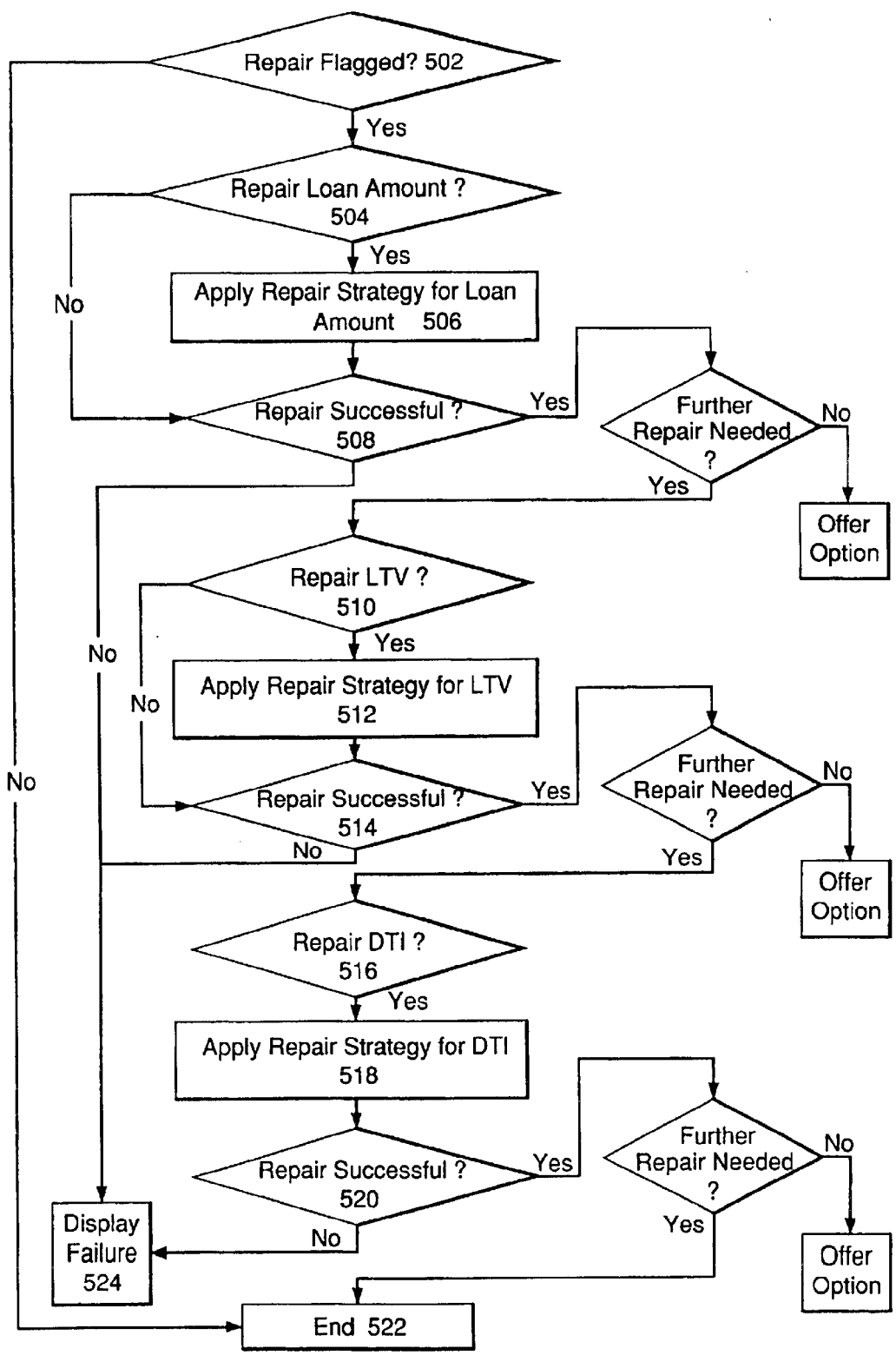

Repair rules may be included in the MSS, and are used to execute repair strategies to modify the preferences specified by a customer, to thereby allow the customer, who might otherwise not qualify, to qualify for a product. An over view of the repair process can be seen in FIG. 5. The repair overrides the customer's preferences in an attempt by the MSS to offer a modified option to the applicant. Where applicable, the application of repair may enable the offeror to generate an option, such as a sub-prime mortgage option, to a customer, even if the original customer preferred request failed to meet the offeror's original program and/or credit guidelines. Such failures might include, for example, a customer requesting an option having an above-allowable DTI for that customer, an above-allowable LTV for that customer, a longer than-allowable term for that customer, or a loan request or cash out request in excess of that allowed to a particular customer under the offeror's requirements for that customer. Repair rules may be invoked, for example, when an attempt at compensation has failed.

The repair is performed where a preferred option is not generated. The customer request may then be flagged for repair. In particular, if the requested attributes deviate from the requirements of the product identified as preferred, the specific areas of deviation are flagged for repair. Following the flagging, repair rules are applied to modify the customer's specified preferences in an attempt to conform to the request to at least the LTV, DTI and amount tolerances within the limits allowed by the offeror. The repairs may be attempted in the sequence in which they were flagged for repair. For example, if the LTV and DTI are flagged, the MSS may always attempt to repair the LTV, followed by an attempt to repair the DTI.

The repair strategies that may be followed for the repair of LTV, DTI, and loan amount will be apparent to those skilled in the art. For example, if the amount specified by the customer is higher than that of the product requested, and, for example, the deal purpose is specified as to receive cash out, then the "decrease debts to pay off" repair strategy may be applied, wherein the debts that were specified by the customer as "debts borrower would like to pay off" are modified to "debts borrower would not like to pay off," starting with the debt with the largest balance. With each such modification, the deal amount is reduced, until the amount no longer exceeds that of the generated option. The repair strategy is executed until it succeeds in meeting the requirement of the generated option, or until it exhausts all possible modifications. As a further example, if the deal purpose is debt consolidation, then the "Decrease cash out" strategy may be executed first. As the cash out is decreased, the loan amount and LTV decreases. If the LTV still fails to satisfy the required LTV of the loan product even after all of the customer's specified cash out has been eliminated, then the subsequent strategy of "Decrease debts to pay off" is executed, and so on. The repair strategies are executed sequentially until it succeeds in meeting the required LTV of the product, or until it exhausts all LTV repair strategies. As an additional example of repair, with respect to DTI, if the deal purpose is cash out, then the "Extend term" strategy is executed first. As the term of the deal, such as a mortgage loan, is increased, the monthly payment and the DTI inherently decrease. If the DTI still fails to satisfy the required DTI of the product, even after the term has been extended to its maximum (generally 30 years), then the subsequent strategy of "Increase mortgage loan amount to pay off more debt" is executed, and so on.

Other repair strategies, in addition to those discussed hereinabove, will be apparent to those skilled in the art from the examples shown. Further, in a preferred embodiment, the application of repairs is performed subsequent to the application of compensating factors, but repair may also be performed before, in conjunction with, or entirely without compensation. Additionally, it will be apparent to those skilled in the art that, over time, an empirical database of compensation and/or repair strategies implemented, successful, and failed may be built, and, following the building of the empirical compensation and/or repair database, an empirical database score may replace the assignment of factors as discussed hereinabove, thus generating true risk-based pricing.

Returning now to FIG. 3, the customer can enter into edit preference 334 with the offeror through the DSS system 100. Editing preferences can include a customer proposing edited preferences to the DSS system 100 to modify parameters, in conjunction with the DSS system 100 responding whether or not the edited preference option is acceptable. The edit preferences rules may additionally respond to the customer with a counter-proposal. The edit preferences rules may additionally entail the inclusion of compensation and repair in the attempt to accept the customer generated modified option of the edited preference.

Where a preferred, compensated, or edited preference option for the deal is accepted by the offeror or offerors, the DSS system 100 may then generate 346 up-sell options to the customer. An upsell is generated because it is often the case that a customer, i.e. a potential borrower, does not possess adequate knowledge the optimized, or nearly optimized, loan amount for which that customer may be eligible. The customer will often qualify for a larger cash value than requested, and, if the customer would participate in a deal for a larger value than the customer had requested, both the customer and the offeror would benefit in the manner known to those skilled in the art. Thus, it is preferable to automatically generate up-sell options in addition to any preferred, compensated, or preference edited option. An up-sell option is an option with an amount higher than that requested in the preferred option. An upsell is generally attempted if one product option generated is that of the primary offeror, i.e. the maintainer or owner of the MSS, for example, but an upsell may not be attempted if the options generated pertain only to third party offerors, for example, at the option of the primary offeror.

Figure 6:
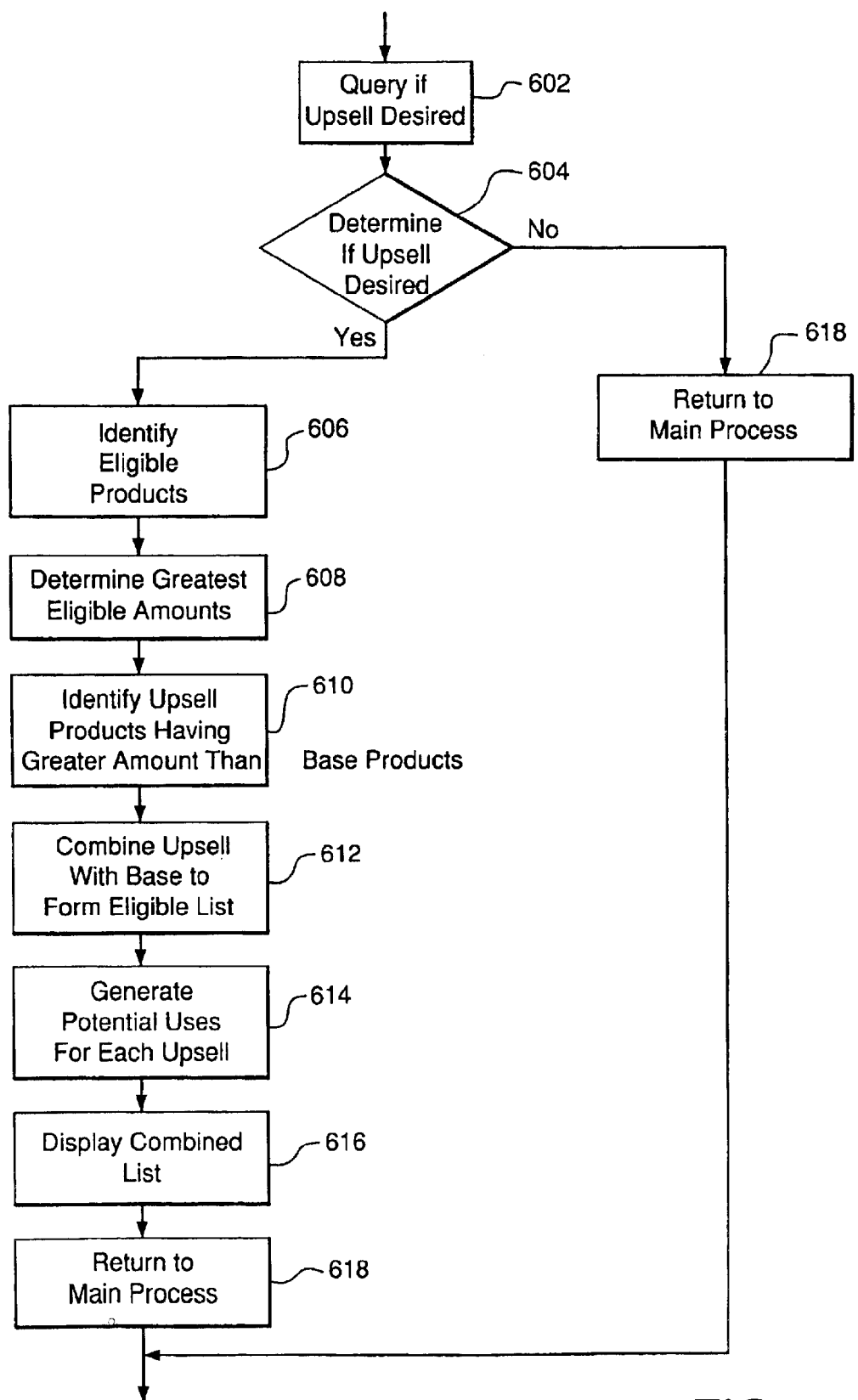

As shown in FIG. 6, the up-sell may query 602 the customer to ascertain if the customer is willing to consider up-sell options. Preferably, the customer is not queried, and up-sell is generated automatically. For the eligible products, DSS 100 determines 608 incrementally larger amounts for which the customer may be eligible by applying upsell strategies and the rules discussed hereinabove. For example, the DSS may query whether the customer could receive an additional $5,000 and remain within the guidelines of any offeror or offerors (which is individual assessed with respect to each remaining offeror), and, if the customer is still within the guidelines of at least one offeror, the DSS may add an additional $5,000, and repeat the iterative process. The DSS 100 may additionally generate a list of potential uses for the excess value of each up-sell loan option. For example, where the amount is inadequate to pay off an existing liability, the excess value is offered as cash, but where an existing lien exists on the property, the potential usage can be to pay off the liability associated with the lien. If the customer does not have any outstanding debts, up-sell recommendation rules may be provided in the MSS 108 so that the recommendations to the customer can be based on the customer's background information, as obtained during the deal structuring.

Once the list of potential uses has been generated for each up-sell product, a list of the up-sell product or products, and of the preferred, compensated, or preference edited products is generated and displayed to the customer.

Once a list of options has or has not been determined, the DSS system 100 can provide an explanation 366 of the results. If a customer is excluded from being offered a specific deal, or if the customer does not understand why another product was selected as the preferred option (i.e. if a repair or compensation took place, for example), the implementation of an explanation function can provide the customer with a heightened understanding of the deal structuring process. The target audience is preferably distinguished when providing explanations. In such an embodiment, the specific explanations provided need to be customized to presumed knowledge, based on whether the audience is a customer or a professional, such as a CSR. Further, for business reasons, certain information for internal use only may be provided to the CSR, but not to the customer. Thus, a separate set of explanation rules is provided in MSS 108 for transforming the rules unto an understandable format for a customer. The explanation rules serve three purposes: to translate the rules into a form understandable to the recipient of the list; to ensure that the list does not improperly disclose proprietary information; and to reduce the size of the explanation by removing from the list rule outcomes that did not affect the determination. Generation of an explanations list may be based on the expert engine noting the rules applied, and the outcome of those rules.

As an example, consider an Exclusionary Rule as follows:

IF (Property Address is one of a set of Excluded States) THEN (bypass mortgage loan option generation).

To create an explanations list, the above rule is modified to include the generation of an explanation text, as shown below.

IF (Property Address is in one of a set of Excluded States) THEN (bypass mortgage loan option generation) AND (generate explanation "We're sorry, but currently we do not grant loans in the state of: STATE.")

The actual state where the property is located is substituted for the: STATE variable in the explanation text, for example. Generated explanations are stored in an explanations table until an explanation list is generated from the stored table, as described further hereinbelow.

Other examples of explanation text might include: "The loan amount is above the maximum allowable," and "The DTI ratio is too high for the loan to be approved." These examples provide a conceptual description of how rules are applied in the present invention. However, in order to flexibly and efficiently implement the capability to generate explanations, data driven methods are preferably employed. In short, a Create Explanation procedure is used by each rule to populate an EXPLANATIONS table in the database. Further, other tables stored in the database may also be referenced. A Create Explanation procedure can be called by any of the rules from within one of the sub-processes in the DSS. The EXPLANATIONS table is dynamically populated with each execution of the Create Explanation procedure. Thus, this table grows larger as the deal structuring process is executed. Ultimately, this table is used to generate an explanation list. An EXPLANATION TEXT table then associates each explanation text identifier with an explanation name, explanation text and other related information. This table is created when the system is constructed. Further, an AUDIENCE table enables explanations to be tailored based on factors such as the audience's level of knowledge (e.g., beginner, intermediate or advanced), the audience's function (e.g., loan officer, broker, analyst, underwriter), and the like. For example, a system engineer audience can be defined, and extremely detailed explanations can be generated for that audience for the purpose of auditing and debugging the system. To generate an EXPLANATIONS display, the EXPLANATIONS table is sorted and filtered to extract only those explanations directed to the AUDIENCE for whom the display is being generated. The result of the sorting and filtering is the explanation list, which contains all of the explanations generated for the intended audience in chronological order.

Figure 7:
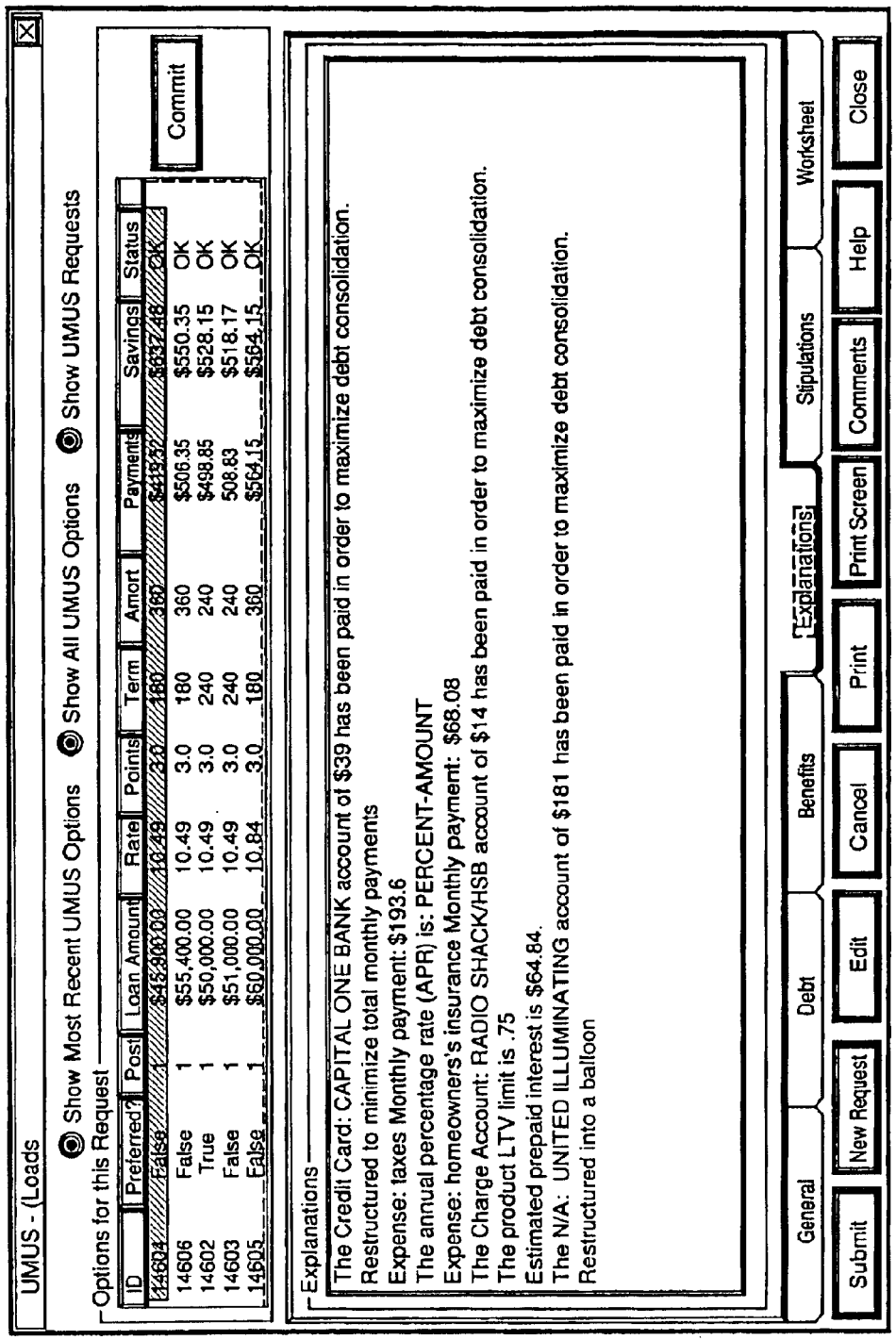

FIG. 7 shows an example of an explanation list displayed by user interface. When a loan is selected by highlighting 802 the specific loan from among the products listed, and the "Explanation" tab is selected 804, the explanations associated with the loan product are preferably displayed 806.

Upon completion of the generation of the list of options available to the customer, the benefits available through each, or all, of the options are preferably presented to or made available to the customer 347. From the perspective of a customer, the presentation of a benefits helps him or her better understand the various advantages to be gained from a particular option. If the customer is presented with at least one up-sell option, the customer can be presented with an explanation of why an up-sell would benefit the customer, thereby helping to increase the number of customers that choose an up-sell option, which upsell option also benefits the offeror. At least one of the benefits presented is preferably individualized to each unique customer. The manner in which benefits can be individualized from entered customer preferences will be apparent to those skilled in the art.

Presentation of benefits may be of particularly importance in the sub-prime deal market. In the sub-prime market, the decision that a customer makes may be based more on the benefits of a particular option, because a sub-prime borrower generally cannot obtain all desired preferences of that customer, due to that customer's financial profile. Thus, if a customer finds that, for example, a first offeror offers a $50,000 loan for $610 per month, and a second offeror offers the same mortgage loan for $605 per month, the customer would generally select the second offeror. However, if the first offeror also offers benefits, such as monthly automatic withdrawal of the payment from a checking account, and/or saves the customer $200 in monthly debt payments, due to the payment of other debts, then the potential borrower may select the first offeror based on the explanation of these benefits.

In general, there are two types of benefits which may be associated with products. There are default benefits that apply to all loan products, and individualized benefits, which may or may not apply based on the specifics of the product and deal structuring information. Default benefits include, for example, automatic deduction of payments from a customer's bank accounts, or not having to make a payment within the first month after closing. Individual benefits include, for example, lowered overall monthly debt from $790 to $695 due to a rolling of existing debts into a single payment product.

The generation of a benefits statement may be performed using an application of benefit rules to the information contained in the deal structuring. Exemplary benefits rules are provided in Table 10. As an example of the application of benefit rules, if a portion of the product could being used to pay off outstanding debts, the application of benefits rules would determine that the number of outstanding payments was being decreased by three. From this, the DSS would inform the customer that the product would reduce the customer's number of monthly payments from four to one.

Figure 8:
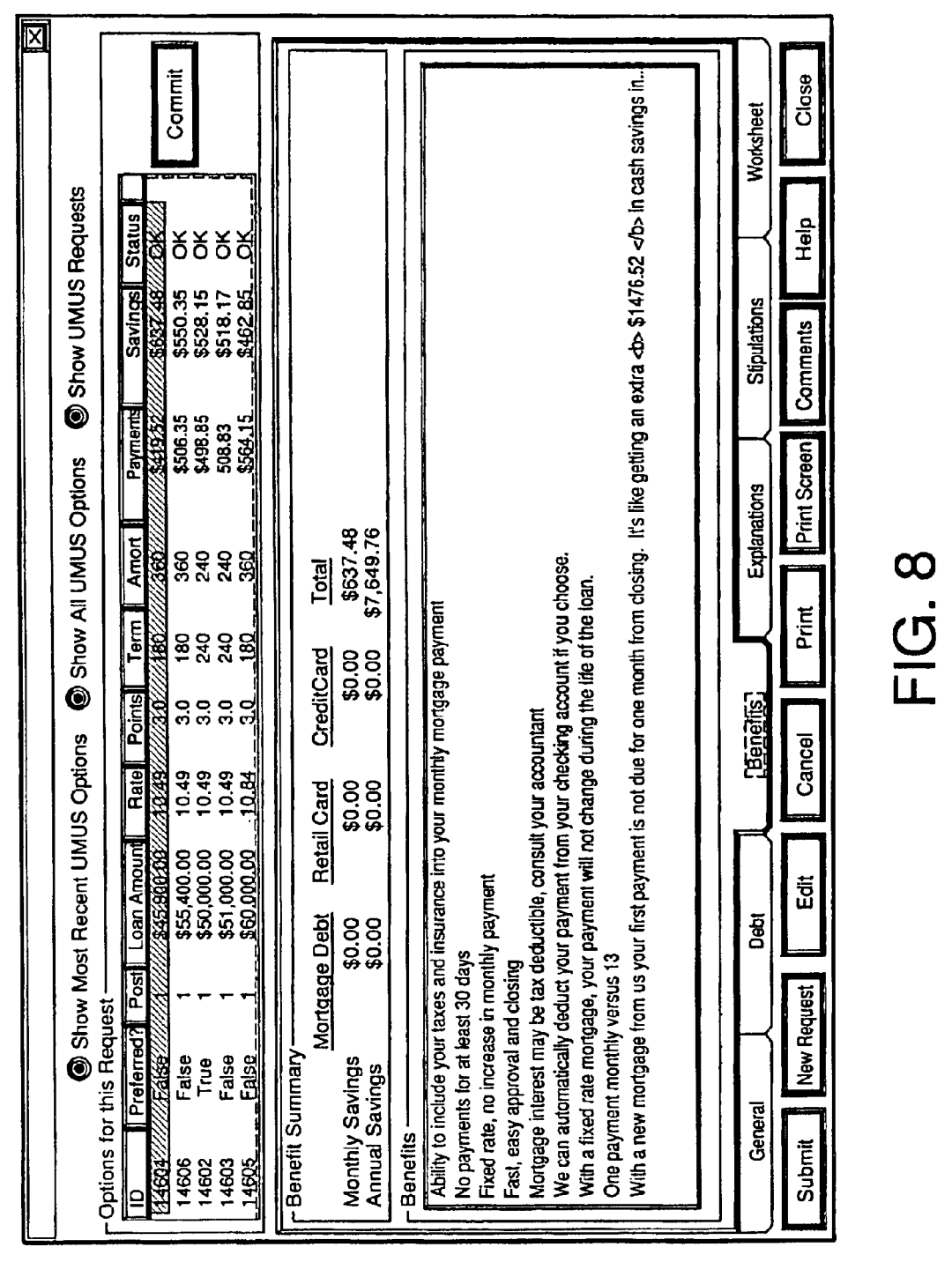

FIG. 8 shows the screen interface of a benefits display. A benefits window is shown below a display of a plurality of product options. The benefits window is activated by selecting the benefits tab 902 near the bottom of the display. When a product is selected 904, the line entry for the product is highlighted, and the benefits information for that individual loan product is preferably displayed 906 in the benefits window.

At various points throughout the deal structuring process, products not requested by the customer may be cross sold 364. The DSS 100 system may, for example, maintain a database of products and services, the availability of which may minimize the customer's efforts required to complete the planned deal, or to complete an additional deal. Examples of such services may include title insurance and abstracting services, referrals for home inspections, and insurance services for the collateral.

Figure 9:
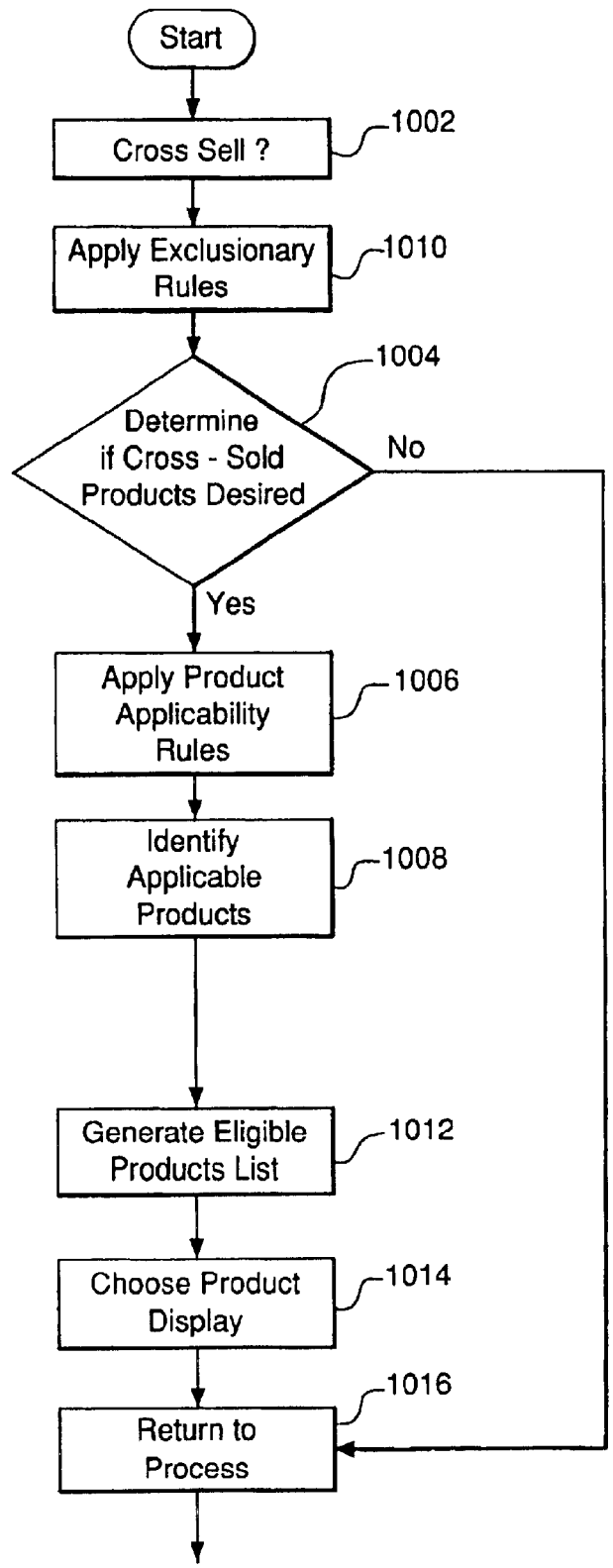

The cross-selling of products is shown generically in FIG. 3 as block 364. FIG. 9 shows the process in greater detail. Once it has been determined that the customer is eligible to receive a deal option, the system may query 1002 the customer whether the customer desires to be offered products and services related to the requested deal structuring, or the system may offer such additional products without querying the customer. The DSS 100 then applies 1006 product applicability rules to the products listed in the database of products and services to identify 1008 applicable products and/or services for cross-selling to the customer. For example, if the customer is purchasing a new construction home, the services of a termite inspector are likely not needed, and should not be offered. If information in the deal structuring discloses that the customer will make a long-distance move to occupy the new property, the DSS system 100 might offer insurance for the goods in transit.

The database of products and/or services can be generated by arranging referral agreements with providers of goods and services. Alternately, products can be included in the database based on a per display fee, such that each time the product is offered to a customer, the offeror is compensated by a fee whether or not the product is chosen. Agreements can also be made between the offeror and the related service provider, wherein the offeror receives a percentage of the service provider's revenue from services actually procured by the customer.

Once a list of applicable products from the database has been identified 1008, the DSS 100 may apply 1010 exclusionary rules associated with the products and/or services, to ensure that products for which the customer is ineligible are not offered to the customer. For example, a title insurance company may limit the territory for which they will write policies, requiring exclusionary rules to prevent that company's title insurance from being offered to a customer who does not reside in the territory. Once the exclusionary rules have been applied to the cross-sell products and/or services, a list of eligible products and/or services is generated 1012 by identifying the products that are both applicable to the customer, and for which the customer is eligible based on the exclusionary rules. This list is preferably displayed to the customer, allowing the customer to select services as desired. Where the cross-sell information is presented to the customer via the Internet, a more robust version of the above process can generate products and/or services requests to providers chosen by the customer by hyperlink, for example, as well as by ordering through the offeror. It will be apparent to those skilled in the art that certain reporting tools may be used in conjunction with the present invention, and, specifically, with the cross-sell aspects of the present invention. For example, the data generated in the process of the present invention may be used to generate sales leads for sale to third parties, and may allow for tracking of the results of, for example, advertising.

Additionally, throughout the above referenced process, customers may desire to interrupt the process to acquire more information or to accommodate other time restrictions. In order to accommodate such demands, the DSS system 100 allows a customer to interrupt the deal structuring procedure, save the data entered to that point, and, at a later point using applicable security precautions, to restart the deal structuring process from the point at which the customer interrupted the procedure. This stop and save procedure can also be invoked from within the advisor module, allowing a customer to break an advisory session into a plurality of sessions.

Certain situations within the deal structuring process may be designated in the DSS for underwriter involvement, and, alternatively, a customer may not understand particular points in the deal structuring process, and thus may have questions that he or she feels need to be answered before the deal structuring process can continue. Although "help" information can be provided by the DSS for basic questions, the customer may not feel that their concerns are adequately resolved by the "help" information.

The DSS system 100 thus preferably incorporates a CSR/UW Invocation interface, which allows a customer of the DSS system 100 to invoke a CSR/UW into the deal structuring process. The involvement can be through a pop-up window allowing text messaging, a telephonic contact, or can involve referencing of the CSR/UW to provide options or approvals for a situation outside of the MSS rules. Alternatively, the CSR/UW can be invoked to manually conduct repair or compensation of loans which do not meet the standard criteria associated with the DSS system 100, as discussed hereinabove.

If an option for which the customer is eligible is identified in the process described hereinabove, the offeror must still determine the stipulations that apply to the customer for the generated loan option. Stipulations are conditions that the customer must meet before final approval of the deal. Examples of stipulations include the provision of documents such as a clear title, property appraisal, credit report, and flood certificate. Offerors specify stipulations for virtually all options offered to customers.

There are at least three basic types of stipulations: stipulations based on documentation type and income type; stipulations based on other attributes of the customer and the specific product; and stipulations based on other miscellaneous factors. Documentation and income stipulations are based on the Documentation Type (full documentation, no income qualification or no income validation, for example) and other income-related information provide by the customer. Examples of this type of stipulation include requiring the customer to submit copies of their W-2 statements covering the preceding 2 years if the customer is a salaried or hourly employee, or bank statements covering the preceding 6 months if the customer is self-employed, for example. Stipulations based on customer attributes include requiring the customer to provide a copy of documentation for the first secured loan on a property if the customer is requesting a loan that will be junior to the first secured loan, or proof of rental payments if the customer does not currently own a home, for example. Miscellaneous stipulations include requiring the customer to provide a copy of the divorce decree if the customer is recently divorced, or requiring the customer to provide the discharge notice if the customer has previously claimed bankruptcy, for example. Tables 11 to 13 list exemplary rules used to generate a stipulations list.

Figure 10:
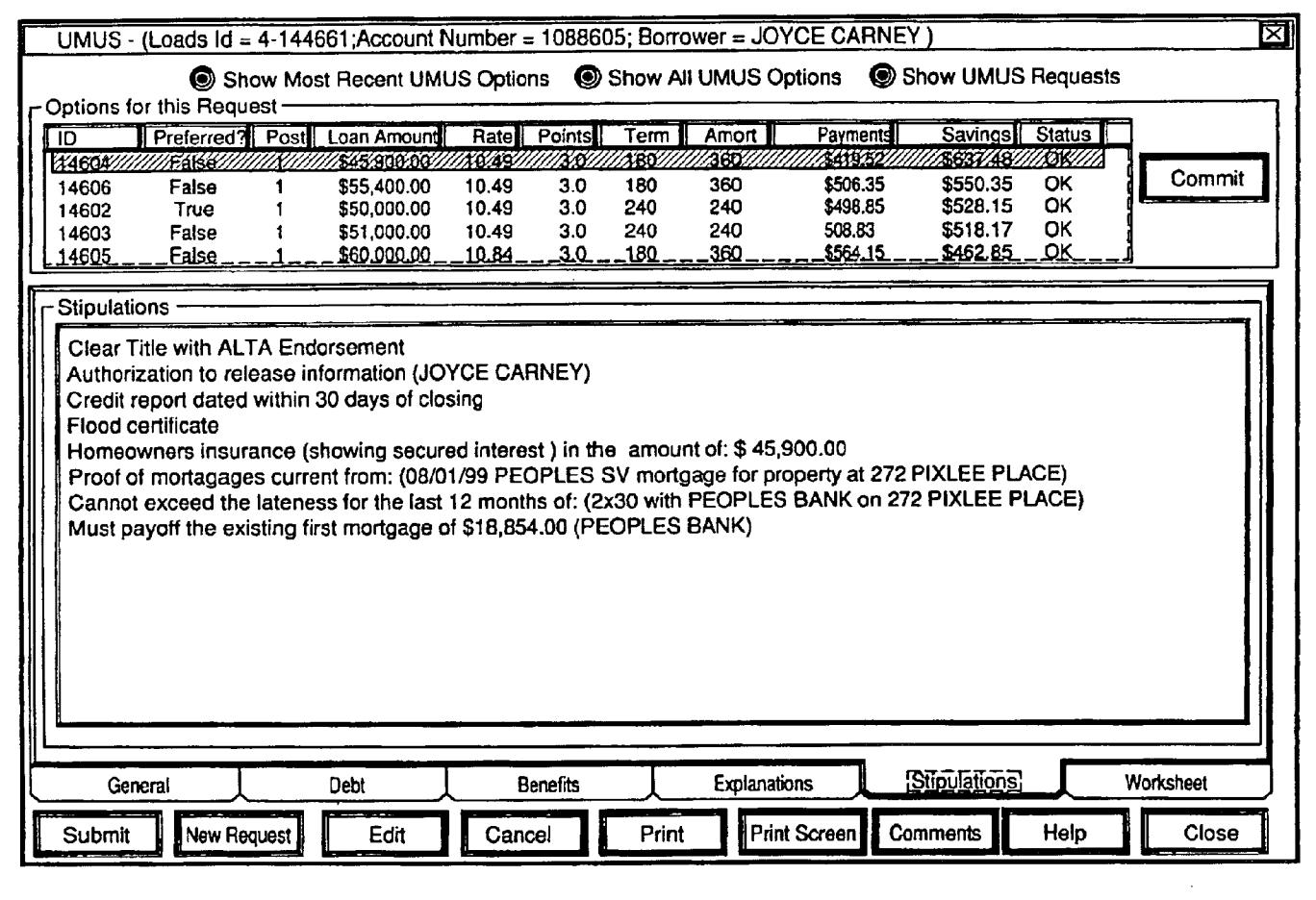

Once a product is identified for which the customer is eligible, the system generates a stipulations list for that product. The list is generated by applying the Stipulations rules to the information contained in the deal structuring record. The list of stipulations generated can be displayed on a user interface, as shown on FIG. 10. Once the user has identified 1102 the loan product for which he or she is interested in reviewing the stipulations, the user may, for example, select a "Stipulations" tab 1104, causing the stipulations to be displayed 1106 in a window below the product list.

At the conclusion of the above referenced process, the customer may enter, for example, an application process based on the product option selected by that customer. This application process may also be automated, as is known in the art, and, during this application process, all information received during the process discussed herein may be verified and/or incorporated by a UW to approve or decline a product offering. Thus, the process and system of the present invention allow a customer to move from an introduction to deal structuring to, for example, a closing, without human intervention.

The above referenced process may employ a commercial loan origination software package, such as one that incorporates a database management system configured specifically for the loan origination contemplated. Examples of commercial mortgage loan origination software packages include Mortgage Ware (INTERLINQ Software Corporation) and Virtual Mortgage Officer (Contour Software, Inc.), for example.

In certain preferred embodiments of the present invention, a database or databases are used to store all information submitted by a customer, including the customer's name, address, social security number, and preferred parameters, for example. The rules discussed hereinabove are also preferably included in a database, which database is the same or related to the database including the customer information. The rules database preferably includes the rules for multiple offerors, including the offeror and third party offerors, and the rules may be applied in a one-to-one fashion with the customer. In a many-to-one fashion with the customer, or in a one to many fashion with the customer. As such, the options generated may be options from numerous offerors to one customer, from the primary offeror to the customer, or from many customers to one offeror. Additonally, the parameters of each deal that is offered to the customer may stored as well so that for example, CSRs may later access such data. Stipulations, statements of benefits, explanations of underwriting decisions, and other data relating to proposed loans may also be stored. In addition, rules relating to loan underwriting may also be stored in the same or a different database.

It should be noted that the present invention may be implemented without the use of a database, particularly in embodiments in which the amount of data to be stored and accessed is relatively small. For example, underwriting rules may be "hard coded" into executable code and data relating to potential borrowers and proposed loans may be stored in flat files.

Figure 12:
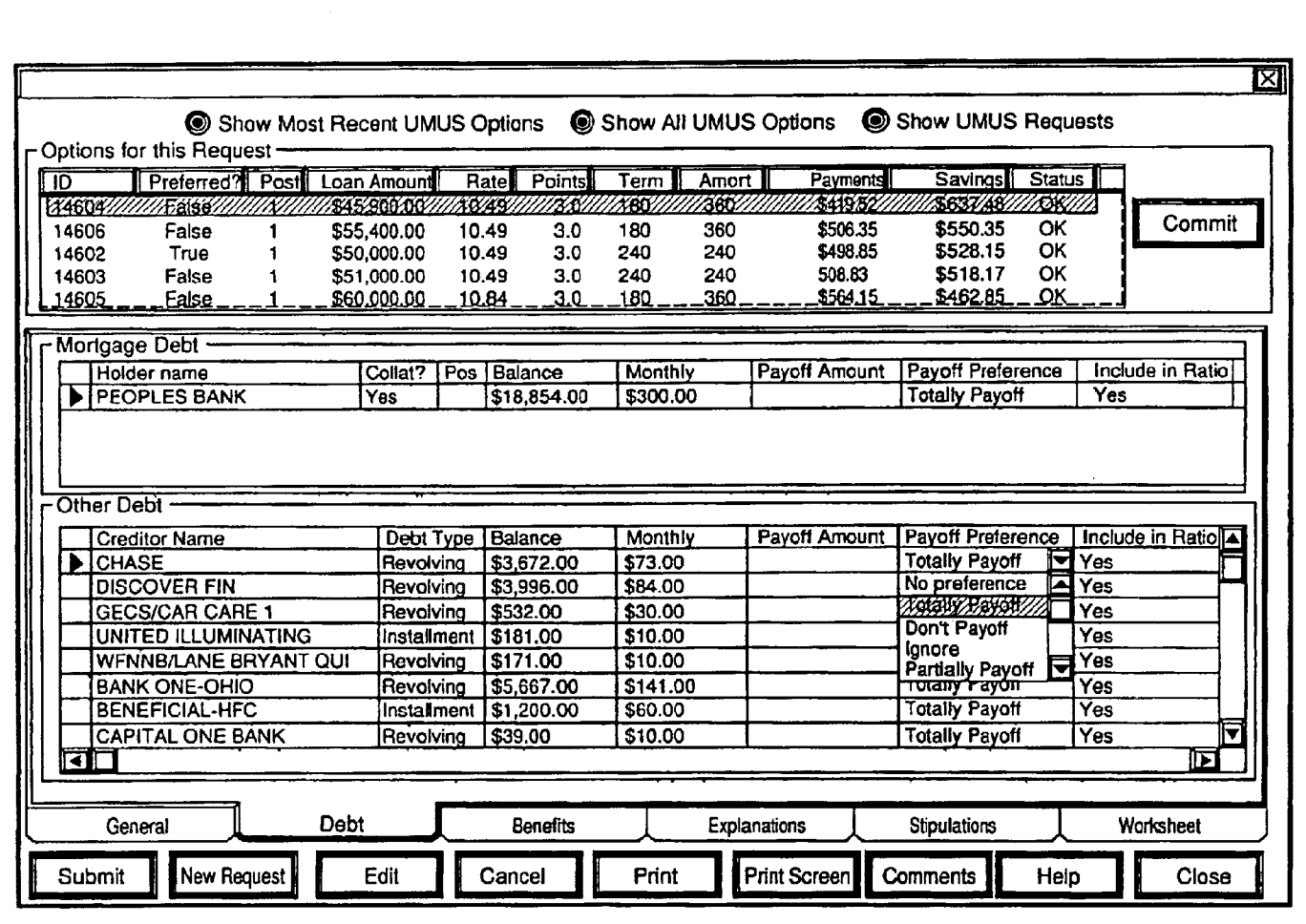

The following is a discussion of an exemplary embodiment of the flow of the method of the present invention. As shown in FIG. 12, a plurality of customer information is requested and received by the MSS 108, possibly following the use of the advisor. In the example shown, the loan amount requested by the customer is $45,900.00. The mortgage to be paid off on the collateral against which the present loan is to be taken if $18,854.00. Using this information, the debt information, the credit information for that customer, and the rules to be applied to the loan requested (for example, the exclusionary rules), the MSS 108 attempts to generate a series of loan options for that customer. The loan options generated by the MSS 108 may include details for each loan, such as whether the loan is a preferred loan from that particular lender, the loan amount the lender will extend to the customer, the interest rate on each loan option, the points to be paid by the customer for each loan option, the term of the loan, the amortization of the loan, the monthly payments for the loan, and the savings and status of the loan, for example. Additional information may be included with each loan option. In some instances, the rules applied by the lender may prevent extension of loan options to the customer. In such an instance, repair rules may be applied to the information supplied by the customer, in an attempt to vary the customer's request and to allow for extension of loan options to the customer, or compensating factors may be applied to the rules themselves, in an attempt to vary the terms of the loan to compensate for the customer's financial shortcomings.

Figure 11:
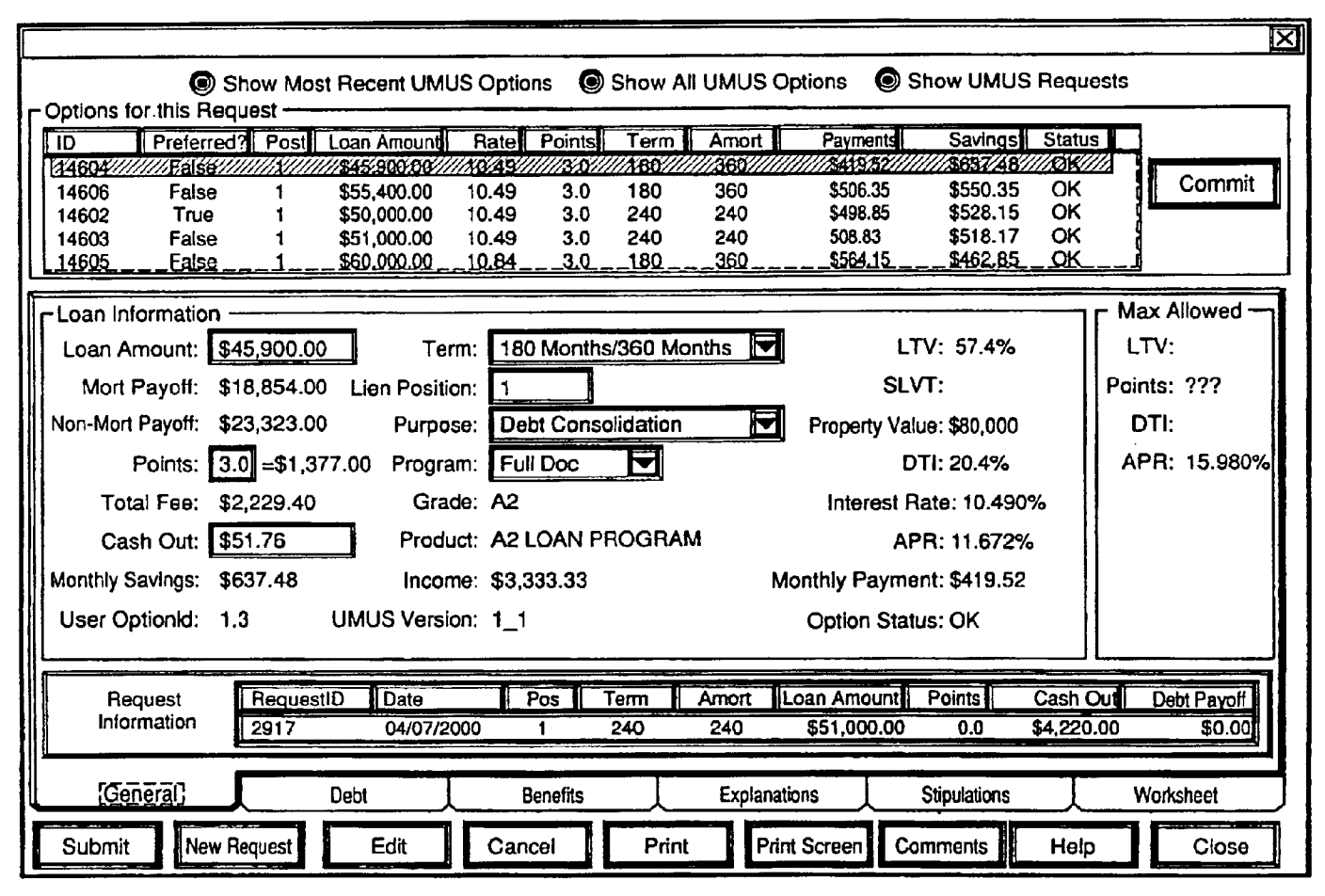
Figure 11A:
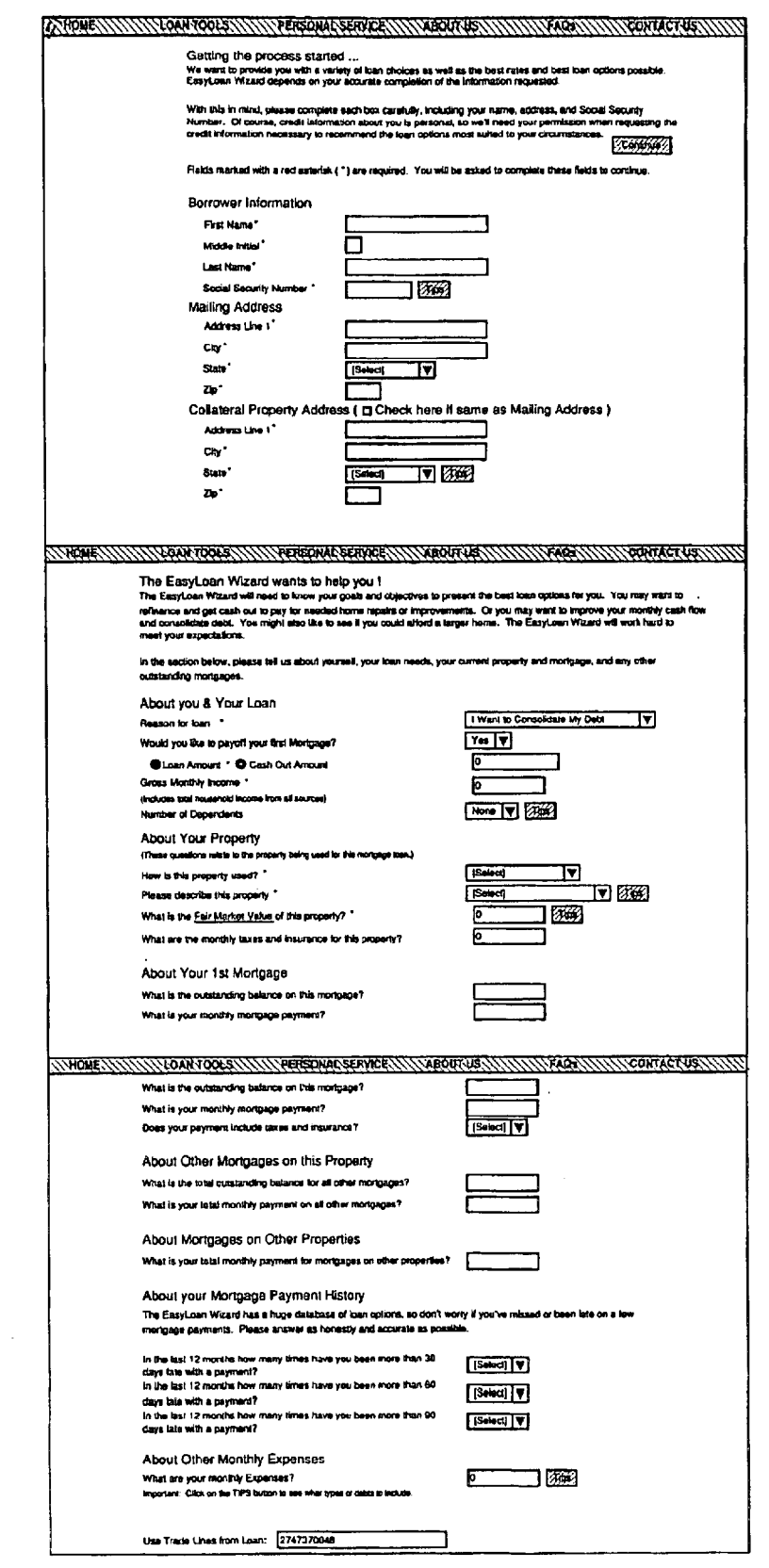

FIG. 11 may be generated, for example, for review by a loan officer. FIG. 11A shows an additional preferred embodiment in which a customer may enter and receive similar information to that of FIG. 11, without direct contact with the loan officer. In the internet embodiment, the customer enters the information, as entered in FIG. 11, into a series of click and fill fields, as shown, after entry of the desired loan amount and criteria. Following entry of the information and loan amount by the customer, and following entry of the debt and credit information for the customer, a series of loan options is generated for the customer, as shown in FIG. 11C.

In an additional preferred embodiment, the internet embodiment may operate in conjunction with a direct access to a CSR. In this embodiment, the customer, while accessing the MSS 108 over the internet, can, if certain predetermined conditions are met, directly contact a CSR. The CSR, upon being contacted by the customer, can then access the MSS 108, and gain real time access to the information and status then-entered by the customer. Thereby, the loan officer can simultaneously review the same information displayed before the customer, at the same time that information is being reviewed by the customer, and therefore can better advise the customer and answer the questions of the customer. This direct access can be gained by the customer through an internet chat window, email, or telephonic connection, for example. In a second preferred embodiment, wherein the customer is speaking with a CSR, which CSR is entering information as in FIG. 12, the customer can, via an internet connection or the like, gain real time access to that then-currently being shown to the CSR.

According to FIG. 11C, each loan is shown with information similar to that shown in FIG. 11, and additionally may be shown with a click option, which click option, if clicked by the customer, shows additional details of any selective loan. In an embodiment wherein similar benefits are available for each loan type, the common benefits to each loan type may additionally be displayed with the loan options, as shown in FIG. 11C. If, following entry of all loan requests, criteria, and debt information, no loan is available, the customer may be presented with a screen such as that shown in FIG. 11C.

FIG. 12 shows the entry of debt information corresponding to each customer. In the embodiment of FIG. 12, the loan options may be displayed in conjunction with the debt information. The debt entry fields of FIG. 12 may be filled by the customer or a loan officer, and should include creditor name, the type of debt, the balance due the creditor, the amount of monthly payments, the payoff amount, the payoff preference, and the inclusion in the debt ratio. The payoff preference may be used by the customer to payoff debts not owed to the lender in part or in full, using the amount borrowed from the lender in the loan for which the present deal structuring is made. FIGS. 12A and 12B show additional preferred embodiments of the debt entry fields. Information similar to that entered in FIG. 12 is entered into the screens by click and fill fields in FIGS. 12A, and 12B. The customer is again presented with the option to pay off debt using the amount borrowed in the present deal structuring in the embodiments of FIGS. 11A and 11B.

In the deal structurings of each of FIGS. 11, 12, 12A, 12B, the credit information for the customer must be accessed by the lender in order to generate loan options. This access may either be done by a loan officer, after gaining authorization from the customer, or, in an internet deal structuring, may be performed by the automated system after the customer clicks an authorization button. A clickable credit review authorization is shown in FIG. 13.

Figure 14A:
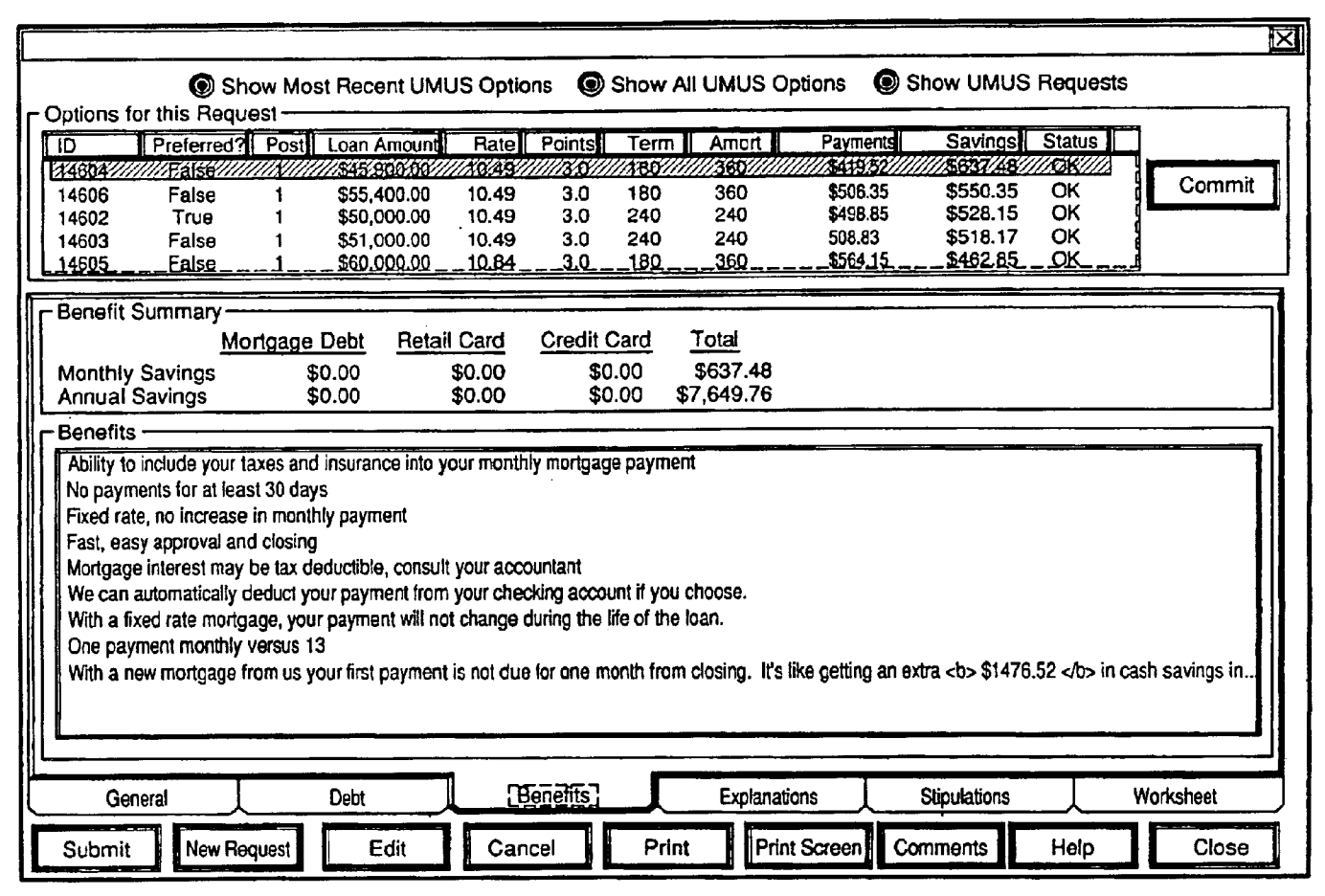

Following the review of the debt, information from the customers, and credit history, the loan options may be generated. Upon generation of the loan options, the customer may be presented with the benefits available through a choice of any one or all of the loan options. The benefit may be, for example, a reduction in total monthly payment, or a reduction in the number of creditors to which the customer must make payment. Several of the benefits may be unique to each customer. For example, the customer receives a unique assessment, individualized to each customer, of the monthly payment amount and savings, or the number of monthly payments to be made. In an internet embodiment, the benefits may be displayed in tabbed format, as shown in FIG. 14. It will be understood by those skilled in the art that numerous other benefits may be available, in addition to those displayed in FIG. 14. In an embodiment wherein the customer is speaking with a loan officer, and in which the loan officer is accessing the MSS 108, the benefits may be displayed by clicking on a benefits tab as shown in FIG. 14.

Figure 15:
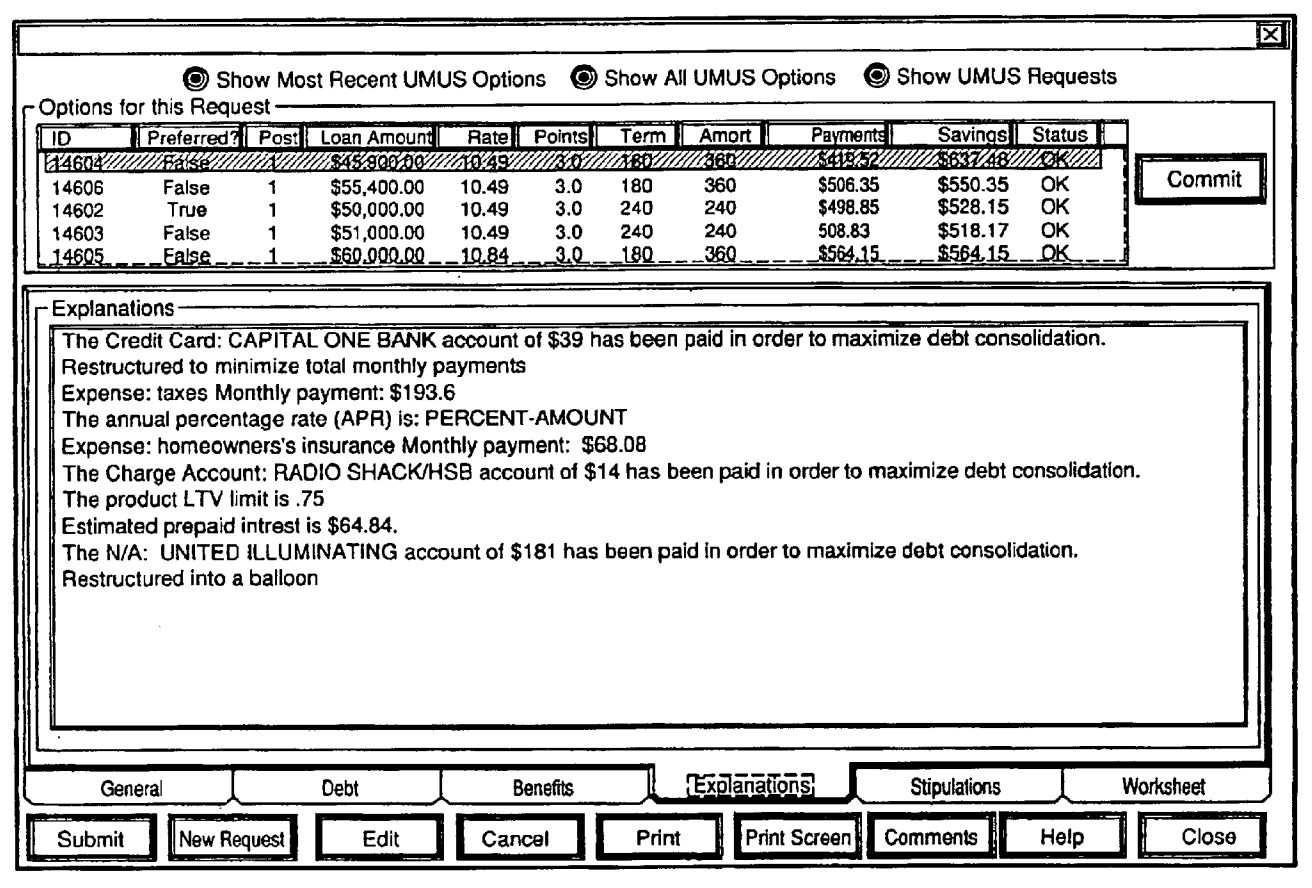

In addition to stating the benefits available for each loan option, the MSS 108 may be used to present explanations to the customers of any repairs, compensations, or changes necessary to enable the lender to present the customer with a loan option. In addition, these explanations may include reasons why a loan, or a preferred deal, was available, or not available, to a particular customer. The explanations may additionally include general explanations as to loan types, amounts, and payments. In the embodiment wherein a loan officer is discussing the loan with the customer via telephone, for example, the explanations may be displayed to the loan officer by clicking on a tab marked explanations, as shown in FIG. 15. In the internet embodiment, the explanations may be presented in tabbed form to the customer as shown in FIG. 14. It should be noted that the explanations may be presented in conjunction with the benefits, or separately from the benefits, and that the explanations are preferably audience specific. In the exemplary embodiment of FIG. 14, it was required that the customer's loan be restructured in order to make the loan available to the customer. In the example shown, the loan needed to be restructured, more debts paid off, and the loan made into a balloon type, in order to make the loan available to the customer, and thus these items are included in the explanation.

Figure 16:
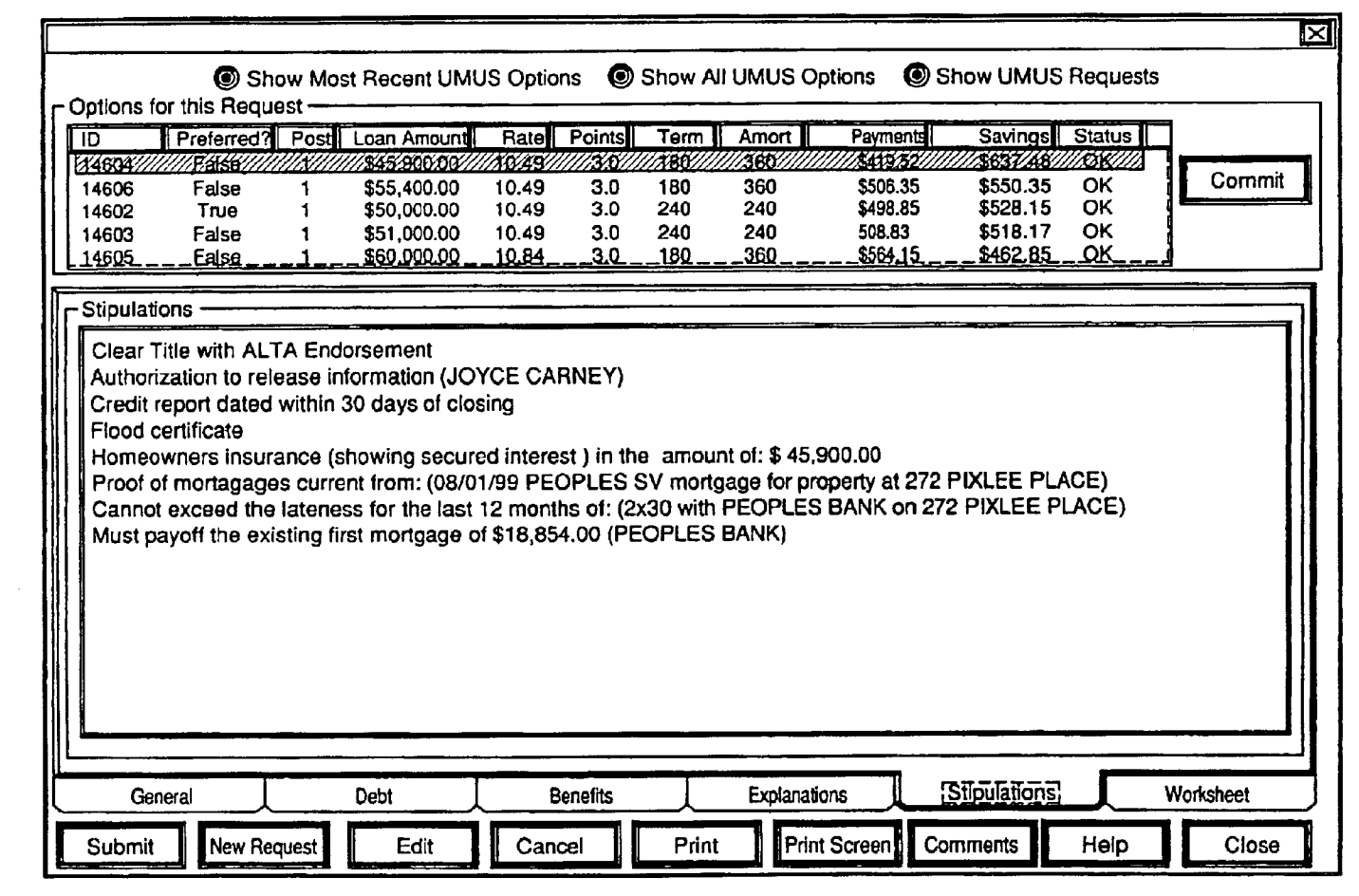

As shown in FIG. 16, each loan option, as shown in FIG. 18b, responsive to the user request, as shown in FIG. 18a, may include stipulations that must be met by the customer in order to make the loan available to the customer. These stipulations are generally known to those in the art, and may include, for example, clearing title to the mortgaged property, authorization by the customer to release certain loan related information, a credit report dated within thirty days of closing, and various types of insurance. Several of these stipulations are shown in FIG. 16. Similarly, the stipulations may be made available to the customer in an internet embodiment, using, for example, the tabbed format similar to that of the benefits and explanations.

Should the customer not wish to accept any of the loan options made available to the customer, the customer may have available, through the MSS 108, an option to make a counteroffer to the lender, by editing the customer's own initial preferences. The lender may then apply the rules, repair, and/or compensating factors to the counteroffer, and choose to make or not make the counteroffer a loan option. This editing preferences process may continue for a predetermined number of iterations, or may be continued indefinitely.

Figure 17:
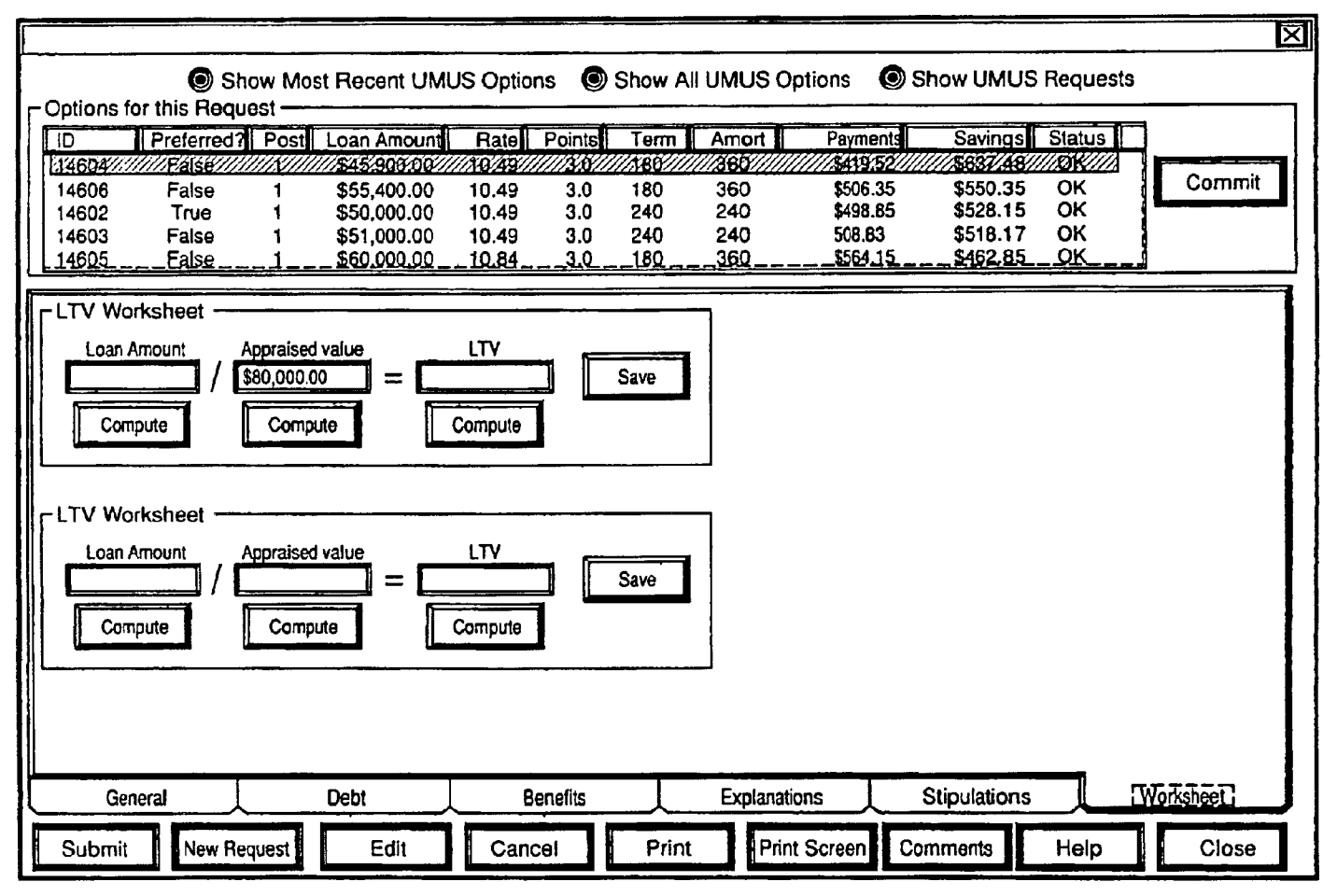

At predetermined points during the deal structuring process, the customer may have made available to him or her a work sheet that allows for the computation of LTV and DTI values, for example. The work sheet is made available to allow the customer to determine, prior to deal structuring, the loans for which the customer may be made eligible. The work sheet generally includes click and fill numerical fields in an equation format. An example of a work sheet is shown as FIG. 17.

In the preferred embodiment of the internet deal structuring, the customer has made available at all points during the deal structuring process an option to stop the deal structuring process, save at the current point in the deal structuring process, and resume the deal structuring process at a later point. This option is preferably made available through either a menu selection option, or a stop and save clickable icon button, for example. The stop and save option is preferably a clickable option, and preferably includes security measures known to those skilled in the art. Similarly, the customer may be guided through the entire process of an internet deal structuring using clickable icon "Continue" buttons, for example.

Those of ordinary skill in the art will recognize that many modifications and variations of the present invention may be implemented. The foregoing description and the following claims are intended to cover all such modifications and variations.

TABLE 1

List of Common Elements Expressing
Customer's Desired Loan Parameters

| Item | Description |
|---|---|
| Term | Specified in months |
| Points | An upfront fee tacked on to the mortgage loan amount, each point equaling 1% of the mortgage loan amount |
| Mortgage loan type | Specified as fixed, balloon, ARM and the like |
| Lien position | Specified as 1st or 2nd position |
| Mortgage loan amount | The amount the borrower would like to borrow |
| Mortgage loan purpose | Home purchase or, if a refinance mortgage loan, either debt consolidation or cash out or both |
| Cash out | Amount of cash borrower would like to have from the mortgage loan |
| Documentation type | Level of income documentation, if any, that the borrower will provide in securing the mortgage loan (e.g. full documentation, no income qualification or no income verification). |
| Debts to pay off | Specification of debts borrower would like to pay off, debts borrower would not like to pay off, and debts to ignore (borrower claims debts are not theirs) |

TABLE 2

List of Exemplary Elements
Describing Collateral

| Item | Description |
|---|---|
| Owner | Name(s) |
| Location | Address, etc. |
| Value | Fair market value, purchase price, etc. |
| Taxes | Amount, frequency, etc. |
| Rental income | Amount, frequency, etc. |
| Occupancy | Owner occupied, not owner occupied, etc. |
| Property type | Single family, condominium, etc. |
| Liens | Lien holder, lien position, etc. |
| Property Insurance | Carrier, coverage amount, premium, etc. |

TABLE 3

List of Common Elements
Of Customer Information

| Item | Description |
|---|---|
| Entity type | Individual, proprietorship, corporation, partnership, etc. |
| Involvement type | Primary borrower, co-borrower, surety, etc. |
| Contact | Name, address, telephone number, etc. |
| General | Age, marital status, number of dependents, etc. |
| Citizenship | U.S. citizen, permanent resident alien, etc. |
| Employer information | Duration of employment, salary, etc. |
| Income and expenses | Amount and frequency of each income and expense |
| Residence | Intention to occupy property as primary residence, etc. |
| Self-declared credit history | Outstanding judgments, bankruptcies and foreclosures in past 7 years, litigation, delinquencies, other obligations, etc. |
| Account assets | List of accounts and balances |
| Other assets | Investments, life insurance, business interests, etc. |
| Home ownership | Owns own home, doesn't own a home and is not going to buy a home with this mortgage loan, etc. |

TABLE 4

Exemplary List of
Exclusionary Rules

| Item | Description |
|---|---|
| Property Exclusionary Rules | IF Property Address is in one of a set of Excluded States, THEN bypass mortgage loan option generation.<br>IF Property Type is one of a set of Excluded Property Types, THEN bypass mortgage loan option generation.<br>IF Property Type is 'High-rise condo (>8 stories)' AND Property Address is not Boulder, CO OR New York, NY, THEN flag for review by underwriter. |
| Borrower Exclusionary Rules | IF Entity Type is a one of a set of Excluded Entity Types, THEN bypass mortgage loan option generation and route to appropriate department.<br>IF Borrower Citizenship is neither a 'US citizen' nor a 'resident alien', THEN bypass mortgage loan option generation.<br>IF Borrower Home Ownership is 'doesn't own a home and is not going to buy a home with this loan' THEN bypass mortgage loan option generation.<br>IF Borrower has a current bankruptcy, THEN proceed to mortgage loan option generation, but flag for review and do not return a generated mortgage loan option to borrower.<br>IF the Borrower's credit cannot be graded because of FICO score or mortgage history, THEN bypass mortgage loan option generation and flag for review. |

TABLE 5

Repair Strategy for Loan Amount

| Mortgage Loan Purpose | Repair Strategy | |
|---|---|---|
| | Mortgage Loan Amount Too Low | Mortgage Loan Amount Too High |
| Cash Out | 1. Increase cash out | 1. Decrease debts to pay off |
| Debt Consolidation | 1. Increase debts to pay off | 1. Decrease cash out |
| Both | | 1. Equally decrease debts to pay off and cash out. |

TABLE 6

Repair Strategy for Loan-To-Value Ratio

| Mortgage Loan Purpose | Repair Strategy |
|---|---|
| Cash Out | Decrease debts to pay off |
| | Decrease points and increase rate |
| | Decrease cash out |
| Debt Consolidation | Decrease cash out |
| | Decrease debts to pay off |
| Both | Equally decrease debts to pay off and cash out |

TABLE 7

Repair Strategy for Debt-To-Income Ratio

| Mortgage Loan Purpose | Repair Strategy |
|---|---|
| Cash Out | Extend term |
| | Increase mortgage loan amount to pay off more debt |
| | Reduce cash out to pay off more debt |
| | Reduce cash out |
| | Add points |
| Debt Consolidation | Extend term |
| | Increase mortgage loan amount to pay off more debt |
| | Reduce cash out to pay off more debt |
| | Reduce cash out |
| | Add points |
| Both | Extend term |
| | Increase mortgage loan amount to pay off more debt |
| | Reduce cash out to pay off more debt |
| | Reduce cash out |
| | Add points |

TABLE 8

Description of Up-Sell Loan Options

| Up-Sell Mortgage Loan Option | Brief Description |
|---|---|
| Preferred Mortgage Loan Option Including: Pay Off All Debts and Provide $5,000 Additional Cash Out | The preferred mortgage loan option with increased loan amount sufficient to payoff all debts and provide $5000 additional cash out above the potential borrower's preferred cash out amount |
| Preferred Mortgage Loan Option Including: Pay Off First Mortgage | If a 2nd lien, then the preferred mortgage loan with increased loan amount sufficient to pay off the first mortgage |
| Preferred Mortgage Loan Option Including: Pay Off First Mortgage and | If a 2nd lien, then the preferred mortgage loan with increased loan amount sufficient to pay off the first mortgage and provide |
| Provide $5,000 Additional Cash Out | $5,000 additional cash out above the potential borrower's preferred cash out amount |
| Preferred Mortgage Loan Option Including: Maximize Cash Out | The preferred mortgage loan option with loan amount maximized to provide maximum cash out amount |
| Preferred Mortgage Loan Option Including: Minimize Total Monthly Debt Payment | The preferred mortgage loan option with loan amount maximized to provide the lowest monthly payment. |

TABLE 9

Exemplary Audience Table

| Field | Description |
|---|---|
| audience_id | Unique database generated identifier. |
| audience_description | Description of an audience, e.g., loan officer, broker, potential borrower, analyst, underwriter, etc. |

TABLE 10

Exemplary Benefits Generation Rules

| Order | Condition | Benefit Text |
|---|---|---|
| | Individualized Benefits | |
| 1 | Borrower asked for cash out with a particular purpose like new car in the Advisor | "Based on what you told us you can receive up to $X for the new car you want." |
| 2A | Borrower asked for cash out and they got it. | "Based on what you told us you can receive the $ :AMOUNT that you asked for." |
| 2B | Borrower asked for debt consolidation and they got it. | "One payment monthly versus :NUM-PAYMENTS" |
| 3A | Didn't ask for debt consolidation but we paid off only non-mortgage debt and reduced their monthly payments. | "Based on what you have told us, you could have an extra $ :AMOUNT in your wallet each month by paying off non-mortgage debt." |
| 3B | Didn't ask for debt consolidation but we paid off both mortgage and non-mortgage debt and reduced their monthly payments. | "Based on what you have told us, you could have an extra $ :AMOUNT in your wallet each month by refinancing your mortgage and paying off other existing debt." |
| 4A | Borrower did not ask for cash out but they got it any way. No mortgages paid off. | "Based on what you have told us, you have enough equity in your home to refinance and get an extra $ :AMOUNT to use any way you wish." |
| 4B | Borrower did not ask for cash out but they got it any way. A mortgage was paid off. | "Based on what you have told us, you have enough equity in your home to refinance and get an extra $ :AMOUNT to use any way you wish." |
| 5A | Borrower did not ask for debt-consolidation but we paid off only non-mortgage debt and monthly payments NOT reduced. | "Based on what you have told us, you can consolidate $ :AMOUNT of your non-mortgage debt. This reduces non-mortgage debt from $ :OLD-AMOUNT to $ :NEW-AMOUNT." |

TABLE 10-continued

Exemplary Benefits Generation Rules

| Order | Condition | Benefit Text |
|---|---|---|
| 5B | Borrower did not ask for debt-consolidation but we paid off both mortgage and non-mortgage debt and monthly payments NOT reduced. | "Based on what you have told us, you can consolidate up to $ :AMOUNT of outstanding debt by refinancing your home." |
| 6 | Interest type is fixed rate. But actually now firing on all deals since we don't have any other product. | "With a fixed rate mortgage, your payment will not change during the life of the loan." |
| 7A | Trade-lines payments remaining > term (on mortgage) | Based on what you have told us, you can own your home free of mortgages x months sooner if you refinance. |
| 7B | Trade-lines payments remaining > term (on non-mortgage) | You will pay your debt off x months sooner |
| 8 | If debt paid off is foreclosure then | "You may be able to save your home by refinancing prior to foreclosure" |

Default Benefits

| Order | Condition | Benefit Text |
|---|---|---|
| 9 | Always | "Automatic deduction of payments from your checking account." |
| 10 | Always | "Interest on mortgage loans is usually tax deductible -- consult your tax advisor." |
| 11 | Always | "With a new mortgage from us your first payment is not due for one month from closing. It's like getting an extra $ :PAYMENT in cash savings in your pocket." |
| 12 | Always | "Ability to include your taxes and insurance into your monthly mortgage payment" |
| 13 | Credit Grade <= B2 | "Based on what you have told us, there are ways we may be able to help you repair your credit." |
| 14 | If debt paid off is judgment, tax lien, charge off, collection item | "You are repairing your credit by paying off your "collection item" of $ :AMOUNT" |

TABLE 11

Exemplary Documentation and Income Stipulation Generation Rules

| Condition | Stipulation Text |
|---|---|
| Documentation Type = Full Documentation AND Income Type = Salary/Hourly | 2 Most recent paystubs dated within the last 30 days 2 Years W2's |
| Documentation Type = Full Documentation AND Income Type = Self-Employed | 2 Years Personal and Business tax returns with all schedules (Sched. C's, 1120, 1120S, K-1, etc.) 6 Months most recent consecutive bank statements |
| Documentation Type = Full Documentation AND Income Type = Alimony | Copy of the Divorce Decree and Final Settlement Agreement Copies of birth certificate(s) (if child support) |
| Documentation Type = Full Documentation AND Income Type = Interest and Dividend Income | 2 Years tax returns Account Statements |
| Documentation Type = Full Documentation AND Income Type = Commissions | 2 Years tax returns or W2's |
| Documentation Type = Full | Copy of notes receivable |
| Documentation AND Income Type = Notes Receivable | 2 Years tax returns |
| Documentation Type = Full Documentation AND Income Type = Trust Income | Copy of the Trust Agreement 2 Years tax returns |
| Documentation Type = Full Documentation AND Income Type = Rental Income | Signed Lease Agreements or most recent tax return including Schedule E |
| Documentation Type = Full Documentation AND Income Type = Public Assistance | Original Award Letter Copy of the 2 most recent check stubs |
| Documentation Type = Full Documentation AND Income Type = Social Security, Pension or Disability | Copy of the Award Letter 1099S, Current statement of benefits or most recent Bank Statement showing direct deposit Letter from physician is also required for proof the disability income will continue for at least 3 years |
| Documentation Type = Full Documentation AND Income Type = Foster Care Income | Award letter from the State Copy of the check stubs to verify income |
| Documentation Type = 24 Months Personal Bank Statements | Twenty four months most recent consecutive personal bank statements Business License for the past 2 years |
| Documentation Type = NIQ (No Income Qualification) | 2 Years tax returns with all schedules 6 months most recent consecutive bank statements |
| Documentation Type = NIV (No Income Verification) | Business License Bank statement with the business name, address and account number |

TABLE 12

Exemplary Customer Attribute Stipulation Generation Rules

| Condition | Stipulation Text |
|---|---|
| Required on all mortgage loans | Clear title with ALTA Endorsement |
| Required on all mortgage loans | Credit report |
| Required on all mortgage loans | Full residential credit report |
| Required on all mortgage loans | Flood certificate |
| Required on all mortgage loans | Homeowners insurance (showing secured interest) in the amount of: $X [If our lien position is one (1), the amount of coverage X shall be equal to that of our loan amount. If our lien position is two (2), the amount of coverage X shall be equal to the current balance of the first lien plus our loan amount.] |
| Required on all loans where the collateral property is located in a flood zone. | Flood insurance (showing secured interest) in the amount of: $X [If our lien position is one (1), the amount of coverage X shall be equal to that of our loan amount. If our lien position is two (2), the amount of coverage X shall be equal to the current balance of the first lien plus our loan amount.] |
| Required on all loans | 'As Is' full fair market appraisal (approved appraisers only) in the amount of: $X |
| Required on all loans when the borrower(s) has a loan secured by real estate (mortgage, secured credit line...) regardless if it is on the collateral or asset property. | Proof of mortgages current from: MM/YY [MM/YY is the last reporting date of each mortgage on the credit report. If the mortgage(s) are not on the credit report, the value to be used is the deal structuring date minus one (1) year. For example, if the deal structuring date is 1/11/2000, MM/YY is 1/1999.] |

TABLE 12-continued

Exemplary Customer Attribute Stipulation Generation Rules

| Condition | Stipulation Text |
|---|---|
| Required when our borrower(s) does not own, but rents the property in which he currently resides. | Proof of rental payment current from: MM/YY [X is the deal structuring date minus one (1) year. For example, if the deal structuring date is 1/11/2000, MM/YY is 1/99.] |
| Required on all loans when we are in second (2nd) lien position. | Proof of monthly mortgage payment in the amount of: $X [X is the monthly payment amount of the lien in the first position in which we are taking a second (2nd) behind.] |
| Required when the borrower(s) is obligated to repay a loan that is secured by real estate (mortgage, line of credit...) or pays a monthly rental expense | Cannot exceed the lateness for the last 12 months of: X The value X is the maximum number of mortgage or rental late payments allowed by any particular loan grade within the last 12 months. A++ = 0 late payments of 30 days A1 = 1 late payment of 30 days A2 = 2 late payments of 30 days A90 = 2 late payments of 30 days B1 = 3 late payments of 30 days B2 = 4 late payments of 30 days C1 = 4 late payments of 30 days, 1 late payment of 60 days C2 = 4 late payments of 30 days, 2 late payments of 60 days D1 = 1 late payment of 120 days |
| Required when we are doing a loan in the first lien position and we are paying off the existing first mortgage. | Must payoff the existing first mortgage of: $X [X is the payoff amount for the existing first mortgage.] |
| Required when we are doing a loan in the second lien position and we are paying off the existing second mortgage. | Must payoff the existing second mortgage of: $X [X is the payoff amount for the existing second mortgage.] |
| Required on all loans where any non-mortgage debts are being paid off. | Must payoff miscellaneous debts |
| Required on all loans where we are doing a mortgage in the second lien position. | Copy of the first mortgage note |
| Required on all loans where we are doing a mortgage in the second lien position. | Proof the taxes are escrowed in the first mortgage [If the taxes are included in the first mortgage payment, the value will be "Escrowed". If the taxes are not included in the first mortgage payment, the value will be "Not Escrowed".] |
| Required on all loans where we are doing a mortgage in the second lien position. | Proof the insurance is escrowed in the first mortgage [If the homeowners insurance is included in the first mortgage payment, then the value will be "Escrowed". If the homeowners insurance is not included in the first mortgage payment, then the value will be "Not Escrowed".] |
| Required on all purchase money transactions. | Copy of the Sales Agreement executed by all parties |
| Verification of down payment (escrow letter) | Verification of down payment (escrow letter) |
| Required on all purchase money transactions. | Three months bank statements OR VOD showing sufficient funds to close |
| Required on all mortgage loans we make to pay off a land contract. | Copy of the Land Sales Contract |

TABLE 13

Exemplary Miscellaneous Stipulation Generation Rules

| Condition | Stipulation Text |
|---|---|
| If Marital Status = Divorced | Copy of Divorce Decree Required |
| If Marital Status = Separated | Copy of Divorce Separation agreement Required |
| If Marital Status = Widow | Copy of Divorce Death certificate Required |
| If Bankruptcies AND Foreclosures In Past 7 Years = Prior Bankruptcy | Copy of Divorce Discharge notice Required |
| If Outstanding Judgments = In Bankruptcy | Copy of Divorce Payoff from trustee and schedules of debts Required |
| If Property Type = Condo | Copy of Divorce Condo association bylaws Required |
| If Occupancy = Non-owner occupied | Copy of Divorce Current leases Required |
| If Home Ownership = Owned property less then 1 year | Copy of Divorce Copy of deed Required |

That which is claimed is:

1. A computerized method of automatically generating, based on the preferences of a potential borrower, and of presenting to the potential borrower via a computerized network, multiple alternative loan offers from a first loan entity for a loan secured by collateral, comprising the steps of:

(a) prompting the potential borrower for at least one loan parameter input to the first loan entity via at least one computer interface;

(b) prompting the potential borrower, via the at least one computer interface, for information relating to the potential borrower;

(c) automatically interfacing with at least one credit reporting service to real-time access and review the credit history of the potential borrower;

(d) applying a plurality of loan origination rules to the at least one loan parameter and the information relating to the potential borrower;

(e) contemporaneously applying a plurality of strategies, contemporaneously with said applying a plurality of loan origination rules, to compensate for a risk in, to perform a repair of, and to perform an upsell on the results of step (d), wherein said contemporaneously applying a plurality of strategies comprises varying at least one of the at least one loan parameter and at least one of the plurality of loan origination rules;

(f) generating at least two proposed loans based on the performance of steps (d) and (e); and (g) presenting the potential borrower with the at least two proposed loans from the first loan entity via the at least one computer interface,
wherein the at least one loan parameter comprises a loan parameter relating to the amount of the loan; and
wherein the information relating to the potential borrower comprises information relating to the collateral offered by the potential borrower.

2. The method of claim 1, wherein the at least one loan parameter relating to the amount of the loan comprises the gross amount of the loan.

3. The method of claim 1, wherein the at least one loan parameter relating to the amount of the loan comprises the proceeds of the loan, net of all fees.

4. The method of claim 1, wherein the at least one loan parameter relating to the amount of the loan comprises the monthly payment that would be due under the terms of the proposed loan.

5. The method of claim 1, wherein the at least one loan parameter relating to the amount of the loan comprises the total monthly debt service that the potential borrower would be required to pay with respect to the proposed loan and with respect to all of the potential borrower's existing debts that would not be discharged with the proceeds of the proposed loan.

6. The method of claim 1, wherein the at least one loan parameter comprises the loan term.

7. The method of claim 1, wherein the at least one loan parameter comprises the number of points payable by the applicant.

8. The method of claim 1, wherein the at least one loan parameter comprises the loan interest rate.

9. The method of claim 1, wherein the at least one loan parameter comprises the loan's APR.

10. The method of claim 1, wherein the at least one loan parameter comprises whether the loan interest rate is fixed.

11. The method of claim 1, wherein the at least one loan parameter comprises whether the loan is a balloon loan.

12. The method of claim 1, wherein the at least one loan parameter comprises whether the loan includes a prepayment penalty.

13. The method of claim 1, wherein the information relating to the collateral comprises the lien position of the lender in the collateral.

14. The method of claim 1, wherein the information relating to the collateral comprises the type of collateral offered by the potential borrower.

15. The method of claim 1, wherein the information relating to the collateral comprises information relating to the identity of collateral offered by the potential borrower.

16. The method of claim 1, wherein the information relating to the potential borrower comprises the amount of the potential borrower's income.

17. The method of claim 1, wherein the information relating to the potential borrower comprises the amount of the potential borrower's debts.

18. The method of claim 1, wherein the information relating to the potential borrower comprises the potential borrower's name.

19. The method of claim 1, wherein the information relating to the potential borrower comprises the potential borrower's taxpayer identification number.

20. The method of claim 1, wherein the information relating to the potential borrower comprises whether the potential borrower is an individual.

21. The method of claim 1, wherein the information relating to the potential borrower comprises information relating to the potential borrower's spouse.

22. The method of claim 1, wherein the information relating to the potential borrower comprises the potential borrower's objective in applying for the loan.

23. The method of claim 1, wherein the information relating to the potential borrower comprises information relating to the potential borrower's credit history.

24. The method of claim 1, further comprising the step of:
storing the at least one loan parameter received from the potential borrower in response to step (a) and storing the information relating to the potential borrower received from the potential borrower in response to step (b).

25. The method of claim 24, wherein the at least one loan parameter and the information relating to the potential borrower are stored in a database.

26. The method of claim 1, wherein the plurality of loan origination rules is stored in a knowledge base.

27. The method of claim 1, wherein the plurality of loan origination rules are applied to the data received from the potential borrower in response to steps (a) and (b) using an inference engine.

28. The method of claim 1, wherein the plurality of loan origination rules are applied to the data received from the potential borrower in response to steps (a) and (b) using an expert system.

29. The method of claim 1, wherein the potential borrower is prompted in steps (a) and (b) over the Internet.

30. The method of claim 1, wherein the potential borrower is prompted in steps (a) and (b) over the World Wide Web ("Web").

31. The method of claim 1, wherein the potential borrower is prompted in steps (a) and (b) by an employee of the lender who enters the information supplied by the potential borrower in response to steps (a) and (b) into a computer terminal.

32. The method of claim 1, wherein the loan origination rules comprise at least one rule relating to the type of applicant.

33. The method of claim 32, wherein the at least one rule relating to the type of potential borrower comprises a rule for rejecting any potential borrower that is not a natural person.

34. The method of claim 1, wherein the loan origination rules comprise at least one rule relating to the state of residence of the potential borrower.

35. The method of claim 1, wherein the loan origination rules comprise at least one rule relating to the state in which the offered collateral is located.

36. The method of claim 35, wherein the at least one rule relating to the state in which the offered collateral is located comprises a rule for rejecting any potential borrower if the state in which the offered collateral is located is not included in a predetermined set of states.

37. The method of claim 1, wherein the loan origination rules comprise at least one rule relating to the ratio of the proposed amount of debt secured by the offered collateral to the value of the collateral.

38. The method of claim 37, wherein the at least one rule relating to the ratio of the proposed amount of debt secured by the offered collateral to the value of the collateral comprises a rule for rejecting any potential borrower if the ratio of the proposed amount of debt secured by the offered collateral to the value of the collateral exceeds a predetermined value.

39. The method of claim 37, wherein the at least one rule relating to the ratio of the proposed amount of debt secured by the offered collateral to the value of the collateral comprises a rule for increasing the interest rate of the loan if the ratio of the proposed amount of debt secured by the offered collateral to the value of the collateral exceeds a predetermined value.

40. The method of claim 1, wherein the loan origination rules comprise at least one rule relating to the ratio of the potential borrower's income to a predetermined percentage of the total debt that the potential borrower would have if the loan were approved and consummated.

41. The method of claim 40, wherein the at least one rule relating to the ratio of the potential borrower's income to a predetermined percentage of the total debt that the applicant would have if the loan were approved and consummated comprises a rule for rejecting an potential borrower if the ratio of the potential borrower's income to a predetermined percentage of the total debt that the potential borrower would have if the loan were approved and consummated exceeds a predetermined value.

42. The method of claim 40, wherein the at least one rule relating to the ratio of the potential borrower's income to a predetermined percentage of the total debt that the potential borrower would have if the loan were approved and consummated comprises a rule for increasing the interest rate of the loan if the ratio of the potential borrower's income to a predetermined percentage of the total debt that the potential borrower would have if the loan were approved and consummated exceeds a predetermined value.

43. The method of claim 1, wherein the loan origination rules comprise at least one rule relating to the ratio of the potential borrower's income to the total monthly payment relating to all of the potential borrower's debts that the potential borrower would have if the loan were approved and consummated.

44. The method of claim 43, wherein the at least one rule relating to the ratio of the potential borrower's income to the total monthly payment relating to all of the potential borrower's debts that the potential borrower would have if the loan were approved and consummated comprises a rule for rejecting an potential borrower if the ratio of the potential borrower's income to the total monthly payment relating to all of the potential borrower's debts that the potential borrower would have if the loan were approved and consummated exceeds a predetermined value.

45. The method of claim 43, wherein the at least one rule relating to the ratio of the potential borrower's income to the total monthly payment relating to all of the potential borrower's debts that the potential borrower would have if the loan were approved and consummated comprises a rule for increasing the interest rate of the loan if the ratio of the potential borrower's income to the total monthly payment relating to all of the potential borrower's debts that the potential borrower would have if the loan were approved and consummated exceeds a predetermined value.

46. The method of claim 1, wherein the loan origination rules comprise at least one rule relating to the potential borrower's credit history.

47. The method of claim 46, wherein the at least one rule relating to the potential borrower's credit history comprises at least one rule relating to bankruptcies of the potential borrower.

48. The method of claim 47, wherein the at least one rule relating to bankruptcies of the potential borrower comprises a rule for rejecting the potential borrower if the potential borrower has ever filed for bankruptcy.

49. The method of claim 47, wherein the at least one rule relating to bankruptcies of the potential borrower comprises a rule for rejecting the potential borrower if the potential borrower has been in receivership more recently than a predetermined length of time prior to applying for the loan.

50. The method of claim 47, wherein the at least one rule relating to bankruptcies of the applicant comprises a rule for rejecting the potential borrower if the potential borrower has any undischarged bankruptcies.

51. The method of claim 46, wherein the at least one rule relating to the potential borrower's credit history comprise at least one rule relating to the potential borrower's payment history.

52. The method of claim 51, wherein the at least one rule relating to the potential borrower's payment history comprises a rule for assigning a credit score to each potential borrower based on the potential borrower's payment history;

wherein the potential borrower's credit score is affected by the number of late payments made by the potential borrower on any of the potential borrower's debts; and wherein the degree to which the potential borrower's credit score is affected by each late payment depends on the number of days by which each late payment was late.

53. The method of claim 52, wherein the potential borrower is rejected if the potential borrower's credit score is worse than a predetermined credit score.

54. The method of claim 52, wherein the potential borrower is rejected if the potential borrower's credit score is worse than a predetermined credit score after the application of compensating factors.

55. The method of claim 1, wherein the at least one strategy comprises generating an alternative proposed loan with a greater loan amount.

56. The method of claim 1, wherein the at least one strategy comprises repairing a rejected loan by altering loan parameters.

57. The method of claim 56, wherein the loan amount is decreased.

58. The method of claim 56, wherein the number of points is increased.

59. The method of claim 56, wherein loan proceeds are used to discharge additional debts.

60. The method of claim 56, wherein loan proceeds are used to discharge senior indebtedness.

61. The method of claim 56, wherein the interest rate is increased.

62. The method of claim 56, wherein the loan term is lengthened.

63. The method of claim 56, wherein the loan is converted to a balloon loan.

64. The method of claim 1, wherein the potential borrower is automatically approved for each proposed loan generated in step (f).

65. The method of claim 1, wherein the potential borrower is automatically approved for each proposed loan generated in step (f), subject to the verification of information submitted by the potential borrower.

66. The method of claim 1, further comprising the step of:

(h) prompting the potential borrower to accept one of the proposed loans.

* * * * *